US012593200B2

(12) United States Patent (10) Patent No.: US 12,593,200 B2
Ryu et al. (45) Date of Patent: Mar. 31, 2026

(54) USER PLANE FUNCTION EVENT EXPOSURE

(71) Applicant: Boost SubscriberCo L.L.C., Englewood, CO (US)

(72) Inventors: Jinsook Ryu, Oakton, VA (US); Kazi Bashir, Lewisville, TX (US); Mehdi Alasti, Arlington, VA (US); Siddhartha Chenumolu, Ashburn, VA (US)

(73) Assignee: Boost SubscriberCo L.L.C., Englewood, CO (US)

( * ) Notice: Subject to any disclaimer, the term of this patent is extended or adjusted under 35 U.S.C. 154(b) by 346 days.

(21) Appl. No.: 18/352,819

(22) Filed: Jul. 14, 2023

(65) Prior Publication Data

US 2024/0022891 A1     Jan. 18, 2024

Related U.S. Application Data

(60) Provisional application No. 63/389,605, filed on Jul. 15, 2022.

(51) Int. Cl.
*H04W 4/00* (2018.01)
*H04W 8/00* (2009.01)
(Continued)

(52) U.S. Cl.
CPC ............. *H04W 8/005* (2013.01); *H04W 8/26* (2013.01); *H04W 12/088* (2021.01); *H04W 48/16* (2013.01); *H04W 72/0453* (2013.01)

(58) Field of Classification Search
CPC ............. H04L 61/2571; H04L 61/2591; H04L 61/2567; H04L 61/2575; H04W 12/088;
(Continued)

(56) References Cited

U.S. PATENT DOCUMENTS 11,483,278 B1 * 10/2022 Lifshitz ................... H04L 61/10
11,729,105 B2 * 8/2023 Alasti ................... H04L 67/10
709/224
(Continued)

FOREIGN PATENT DOCUMENTS

EP       3 897 066 A1    10/2021
KR     20210118608 A    10/2021
(Continued)

OTHER PUBLICATIONS

Nokia et al: "Solution to handle SA6 requirements expressed in S6-200947", 3GPP Draft; S2-2004937, 3rd Generation Partnership Project (3GPP), Mobile Competence Centre; 650, Route des Lucioles; F-06921 Sophia-Antipolis Cedex; France, vol. SA WG2, No. Elbonia; Aug. 19, 2020-Sep. 1, 2020 Aug. 13, 2020 (Aug. 13, 2020), XP051919836, Retrieved from the Internet: URL: https://ftp.3gpp. org/tsg_sa/WG2_Arch/TSGS2_140e_Electronic/Docs/82-2004937. zip S2-2004937 EC PCR answer to S6-200947_vReady.docx [retrieved on Aug. 13, 2020] paragraphs [6.x.1], [6.x.2].
(Continued)

*Primary Examiner* — Marceau Milord
(74) *Attorney, Agent, or Firm* — Kilpatrick Townsend & Stockton LLP

(57) ABSTRACT

Systems, methods, and machine-readable media for obtaining data from a cellular network core are described herein. A request from a network function residing outside of the cellular network core may be received by the cellular network core. The request may correspond to a request for data from the cellular network core. The request may be routed by a network exposure function (NEF) of the cellular network core to a user plane function (UPF) of the cellular network core. UPF data responsive to the request may be determined by the UPF. The UPF data may be transmitted
(Continued)

from the UPF to the network function residing outside of the cellular network core.

18 Claims, 10 Drawing Sheets

(51) Int. Cl.

| | |
|---|---|
| *H04W 8/26* | (2009.01) |
| *H04W 12/088* | (2021.01) |
| *H04W 48/16* | (2009.01) |
| *H04W 72/0453* | (2023.01) |

(58) Field of Classification Search
CPC ... H04W 48/16; H04W 72/0453; H04W 8/26; H04W 8/005
USPC .......................................................... 370/329
See application file for complete search history.

(56) References Cited

U.S. PATENT DOCUMENTS

| | | | | |
|---|---|---|---|---|
| 11,895,083 | B2 * | 2/2024 | Ge | H04L 61/4511 |
| 2014/0325091 | A1 * | 10/2014 | Hong | H04L 12/1407 709/245 |
| 2015/0101009 | A1 * | 4/2015 | Kolbe | H04L 61/2591 726/1 |
| 2018/0227873 | A1 * | 8/2018 | Vrzic | H04W 60/002 |
| 2021/0014766 | A1 * | 1/2021 | Liu | H04W 48/16 |
| 2021/0352575 | A1 * | 11/2021 | Chun | H04W 48/08 |
| 2022/0104004 | A1 * | 3/2022 | Huang | H04W 48/16 |
| 2022/0116330 | A1 * | 4/2022 | Alisawi | H04L 67/5683 |
| 2023/0037031 | A1 * | 2/2023 | Wang | H04W 8/08 |
| 2023/0300104 | A1 * | 9/2023 | Thiebaut | H04L 61/2591 709/206 |
| 2023/0388914 | A1 * | 11/2023 | Qiao | H04W 60/005 |

FOREIGN PATENT DOCUMENTS

| | | |
|---|---|---|
| WO | 2020/221658 A1 | 11/2020 |
| WO | 2022/008951 A1 | 1/2022 |

OTHER PUBLICATIONS

Nokia et al: "Support of the mapping from IP addressing information provideed to an AF to the user identity", 3GPP-Draft; S2-2009002, 3rd Generation Partnership Project (3GPP), Mobile Competence Centre; 650, Route Des Lucioles; F-06921 Sophia-Antipolis Cedex; France vol. SA WG2, No. Elbonia Nov. 9, 2020 ( Nov. 9, 2020), XP051953317, Retrieved from the Internet: URL: https://ftp.3gpp.org/tsg_sa/WG2_Arch/TSGS2_142e_Electronic/Docs/S2-2009002.zip S2-2009002 2502 EC GPSI V2. Docx [retrieved on Nov. 9, 2020] abstract paragraph [4.15.3.2].

International Search Report and Written Opinion for PCT/US2023/027785 mailed Sep. 12, 2023, all pages.

Laurent Thiebaut et al: "Update to the solution 20 (UE IP address mapping information exposure by UPF)", 3GPP Draft; S2-2208222; Type PCR; FS_UPEAS, $3^{rd}$ Generation Partnership Project (3GPP), Mobile Competence Centre; 650, Route Des Lucioles; F-06921 Sophia-Antipolis Cedex; France; vol. 3GPP SA 2, No. Online; Oct. 10, 2022-Oct. 17, 2022 Sep. 30, 2022, XP052207987, Retrieved from the Internet: URL: https://www.3gpp.org/ftp/tsg_sa/WG2_Arch/TSGX2_153E_Electronic_2022-10/Docs/S2-2208222.zip S2-2208222 UPEAS-NAT sol upd V1.docx [retrieved on Sep. 30, 2022].

Jinsook Ryu et al: "KI #2,. New Sol: UE IP address mapping information expos re by UPF", 3GPP Draft; S2-2205585; Type PCR; FS_UPEAS, 3rd Generation Partnership Project (3GPP) 1 Mobile Competence Centre ; 650, Route Des Lucioles ; F-06921 Sophia-Antipolis Cedex; France vol. 3GPP SA 2, No. Qnline; Aug. 17, 2022-Aug. 26, 2022 Aug. 10, 2022 (Aug. 10, 2022), XP052183985, Retrieved from the Internet: URL:https://.3gpp.org/ftp/tsg_sa/WG_. Ar tjl/TSG 2_152E_Electronic_2022-08/Docs/S2-2205585.zip S2-2205585 FS_UPEAS KI2 New Solution.docx [retrieved on Aug. 10, 2022.J paragraph [6.x.2].

* cited by examiner

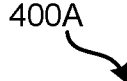
400A
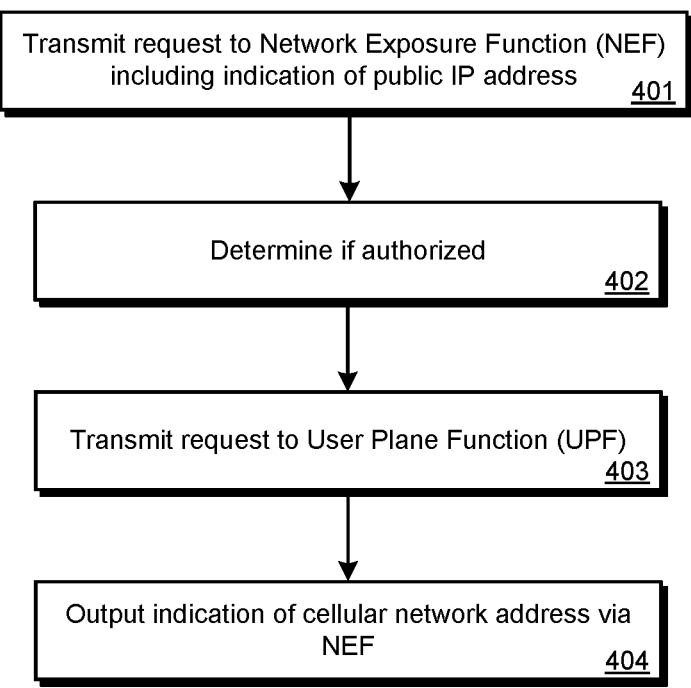
Transmit request to Network Exposure Function (NEF) including indication of public IP address    <u>401</u>
Determine if authorized    <u>402</u>
Transmit request to User Plane Function (UPF)    <u>403</u>
Output indication of cellular network address via NEF    <u>404</u>
FIG. 4A

400B

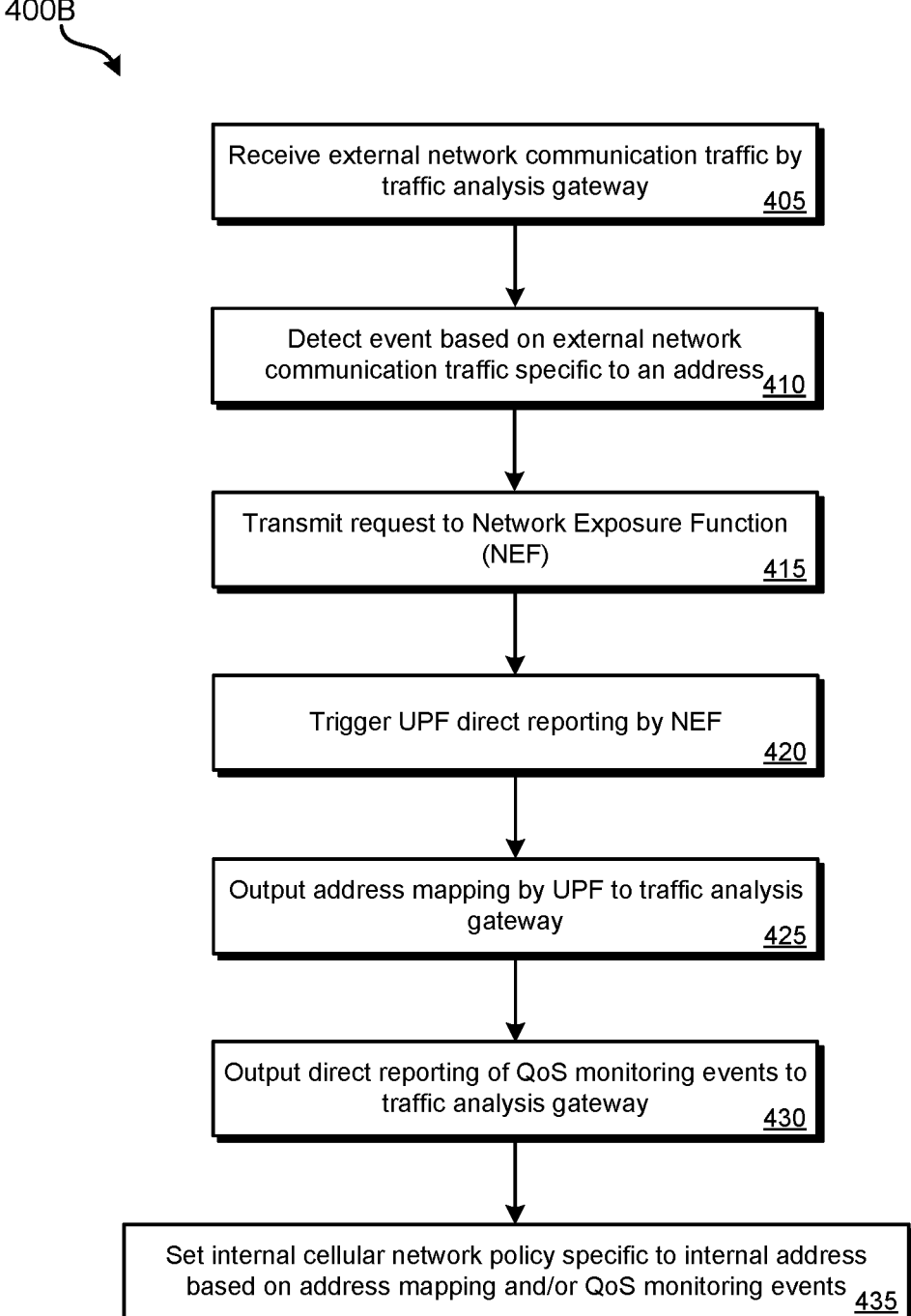

Receive external network communication traffic by
traffic analysis gateway
405

Detect event based on external network
communication traffic specific to an address 410

Transmit request to Network Exposure Function
(NEF)
415

Trigger UPF direct reporting by NEF
420

Output address mapping by UPF to traffic analysis
gateway
425

Output direct reporting of QoS monitoring events to
traffic analysis gateway
430

Set internal cellular network policy specific to internal address
based on address mapping and/or QoS monitoring events 435

FIG. 4B

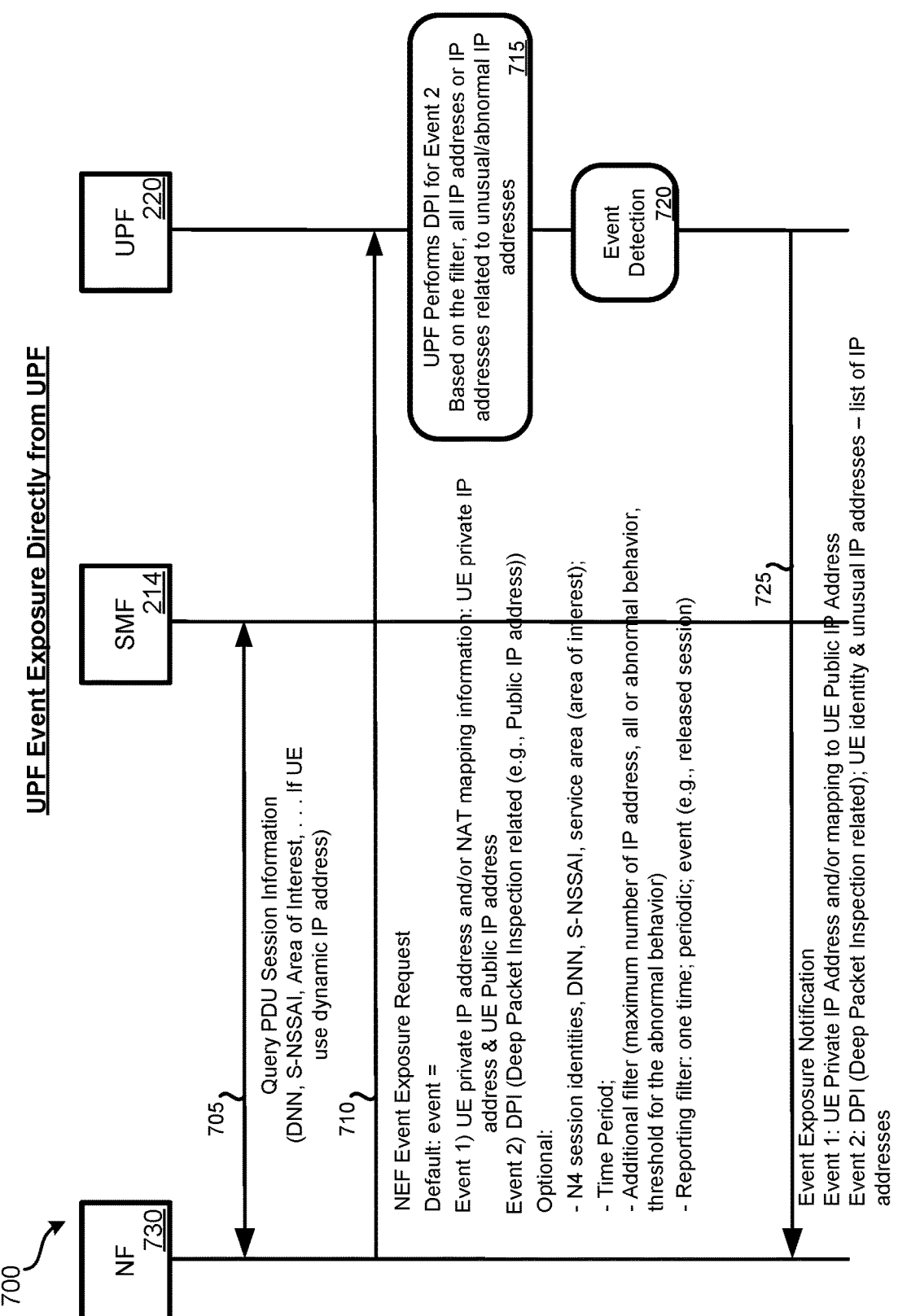

UPF Event Exposure Directly from UPF

705 Query PDU Session Information
(DNN, S-NSSAI, Area of Interest, . . . If UE
use dynamic IP address)

710 NEF Event Exposure Request
Default: event =
Event 1) UE private IP address and/or NAT mapping information: UE private IP
address & UE Public IP address
Event 2) DPI (Deep Packet Inspection related (e.g., Public IP address))
Optional:
- N4 session identities, DNN, S-NSSAI, service area (area of interest);
- Time Period;
- Additional filter (maximum number of IP address, all or abnormal behavior,
threshold for the abnormal behavior)
- Reporting filter: one time; periodic; event (e.g., released session)

UPF Performs DPI for Event 2
Based on the filter, all IP addresses or IP
addresses related to unusual/abnormal IP
addresses 715

Event
Detection
720

725 Event Exposure Notification
Event 1: UE Private IP Address and/or mapping to UE Public IP Address
Event 2: DPI (Deep Packet Inspection related); UE identity & unusual IP addresses – list of IP
addresses

UPF 220

SMF 214

USER PLANE FUNCTION EVENT EXPOSURE

CROSS REFERENCE TO RELATED APPLICATION

This application claims priority to U.S. Provisional Patent Application No. 63/389,605, filed on Jul. 15, 2022, the disclosure of which is incorporated by reference in its entirety for all purposes.

BACKGROUND

Users use user equipment (UE) that communicates through a cellular network to access various networks, such as the Internet. Such access can include the user causing the UE to access a particular webpage. Such access can also include use of a service accessible via the Internet, such as a messaging application, gaming application, streaming application, business application, etc. Despite UE needing to generally have access to the Internet, care must be taken to ensure security on the cellular network is maintained. Further, particular applications or uses of the UE may require special handling in order to ensure an acceptable quality of experience (QoE) for the user and/or acceptable quality of service (QoS) parameters are met.

BRIEF SUMMARY

Certain embodiments of the present disclosure relate generally to cellular networks, and in particular to systems, methods, and computer-readable media for obtaining data from a cellular network core.

In some embodiments, methods for obtaining a cellular network address are presented. A method can include receive a request from a network function residing outside of a cellular network core of a cellular network, the request indicating an external Internet Protocol (IP) address associated with a user equipment (UE). The method can include routing, by a network exposure function of the cellular network core, the request to a user plane function (UPF) of the cellular network core. The method can include determining, by the UPF, the cellular network address for the UE that corresponds to the external IP address. The method can include routing, by the UPF, an indication of the determined cellular network address to the NEF. The method can include transmitting, by the NEF, the indication of the determined cellular network address to the network function residing outside of the cellular network core.

Embodiments of such methods can include one or more of the following features: The request can include an indication of DNN, an indication of S-NSSAI, or both. The indication of DNN, the indication of S-NSSAI, or both can be used to select the UPF from a plurality of UPFs of the cellular network core. The network function can reside outside of the cellular network. The method can include determining, by the NEF, whether the request from the network function is authorized, wherein routing the request to the UPF is performed after authorization is determined. The network function can be a traffic analysis gateway, wherein external network traffic for a plurality of UE that passes through the UPF is analyzed by the traffic analysis gateway. The method can include determining, by the traffic analysis gateway, that an event has occurred for the external IP address of the UE based on external network traffic. The request can be transmitted by the traffic analysis gateway in response to determining the event has occurred. The cellular network core is a 5G New Radio (NR) cellular network core.

In some embodiments, systems are presented. An embodiment of a system can include a cellular network core that comprises a user plane function (UPF) and a network exposure function (NEF). The core can be configured to receive a request from a network function residing outside of the cellular network core, the request indicating an external Internet Protocol (IP) address associated with a user equipment (UE). The core can be configured to route, by the NEF, the request to the UPF. The core can be configured to determine, by the UPF, a cellular network address for the UE that corresponds to the external IP address. The core can be configured to route, by the UPF, an indication of the determined cellular network address to the NEF. The core can be configured to transmit, by the NEF, the indication of the determined cellular network address to the network function residing outside of the cellular network core.

Embodiments of such a system can include one or more of the following features: The request can include an indication of DNN, an indication of S-NSSAI, or both. The indication of DNN, the indication of S-NSSAI, or both can be used to identify the UPF from a plurality of UPFs of the cellular network core. The core can be configured to determine, by the NEF, whether the request from the network function is authorized, wherein routing the request to the UPF is performed after authorization is determined. The system can include the network function, wherein the network function is a traffic analysis gateway, wherein external network traffic for a plurality of UE that passes through the UPF is analyzed by the traffic analysis gateway. The traffic analysis gateway can be configured to determine an event has occurred for the external IP address of the UE of the plurality of UE based on the external network traffic. The request can be transmitted by the traffic analysis gateway in response to determining the event has occurred. A policy of a plurality of stored policies can be applied to the cellular network address based at least in part on determining the event has occurred. The cellular network core is a 5G New Radio (NR) cellular network core. The NEF can be configured to receive a request for traffic characteristics of traffic corresponding to the UE. The NEF can be configured to transmit a data request to a session management function (SMF) to trigger the UPF to output data corresponding to the traffic characteristics of the traffic. The NEF can be configured to transmit the data corresponding to the traffic characteristics to the network function.

In another embodiment of a system, a network function may be present. The NF may reside outside of a cellular network core of a cellular network, that is authorized to communicate with a network exposure function (NEF) of the cellular network core, wherein the network function communicates with one or more application functions (AFs) residing outside of the cellular network. The system can include a radio access network (RAN), comprising a plurality of gNodeBs, that is in communication with the cellular network core. The cellular network core includes a user plane function (UPF) and the NEF. The core can be configured to receive a request from the network function residing outside of the cellular network core, the request indicating an external Internet Protocol (IP) address associated with a user equipment (UE). The core can be configured to route, by the NEF, the request to the UPF. The core can be configured to determine, by the UPF, a cellular network address for the UE that corresponds to the external IP address. The core can be configured to route, by the UPF, an indication of the determined cellular network address to the NEF. The core can be configured to transmit, by the NEF, the indication of the determined cellular network address to the network function residing outside of the cellular network core.

In one aspect, a method for obtaining data from a cellular network core is disclosed. The method may include one or a combination of the following. A request from a network function residing outside of the cellular network core may be received by the cellular network core. The request may correspond to a request for data from the cellular network core. The request may be routed by a NEF of the cellular network core to a UPF of the cellular network core. UPF data responsive to the request may be determined by the UPF. The UPF data may be transmitted from the UPF to the network function residing outside of the cellular network core.

In another aspect, a system disclosed herein may include a cellular network core. The cellular network core may include a UPF and a NEF. The cellular network core may be configured to perform one or a combination of the following operations. A request from a network function residing outside of the cellular network core may be received by the cellular network core. The request may correspond to a request for data from the cellular network core. The request may be routed by the NEF of the cellular network core to the UPF of the cellular network core. UPF data responsive to the request may be determined by the UPF. The UPF data may be transmitted from the UPF to the network function residing outside of the cellular network core.

In yet another aspect, one or more non-transitory, machine-readable media may be disclosed as having machine-readable instructions thereon which, when executed by one or more processing devices, cause the one or more processing devices to perform one or a combination of the following operations. A request from a network function residing outside of the cellular network core may be received by the cellular network core. The request may correspond to a request for data from the cellular network core. The request may be routed by a NEF of the cellular network core to a UPF of the cellular network core. UPF data responsive to the request may be determined by the UPF. The UPF data may be transmitted from the UPF to the network function residing outside of the cellular network core.

In various embodiments, the request for data may correspond to a request for an internal Internet Protocol (IP) address associated with user equipment residing outside of the cellular network core, and the UPF data may include the internal IP address. In various embodiments, the request from the network function may include an external IP address associated with the user equipment, and the internal IP address may be mapped to the external IP address. In various embodiments, the request for data may correspond to a request for mapping information that maps an external IP address associated with user equipment residing outside of the cellular network core to an internal IP address maintained by the cellular network core. In various embodiments, the request from the network function may be received by the NEF directly from the network function.

In various embodiments, the UPF data may be routed by the UPF to the NEF. The transmitting the UPF data from the UPF to the network function may include transmitting the UPF data from the NEF directly to the network function residing outside the cellular network core. In various embodiments, the request from the network function may include one or both of an indication of a DNN and an indication of S-NSSAI. In various embodiments, one or both of the DNN and the S-NSSAI may be used to select the UPF from a plurality of UPFs of the cellular network core. In various embodiments, the cellular network core is a 5G NR cellular network core.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 4A illustrates an embodiment of a method for obtaining a cellular network address from a UPF based on a public IP address.

FIG. 4B illustrates another embodiment of a method for exposing and using data from the UPF.

FIG. 7 illustrates an operation flow diagram corresponding to a method for UPF event exposure directly from the UPF, which may or may not be via the NEF in various embodiments.

DETAILED DESCRIPTION

Figure 1:
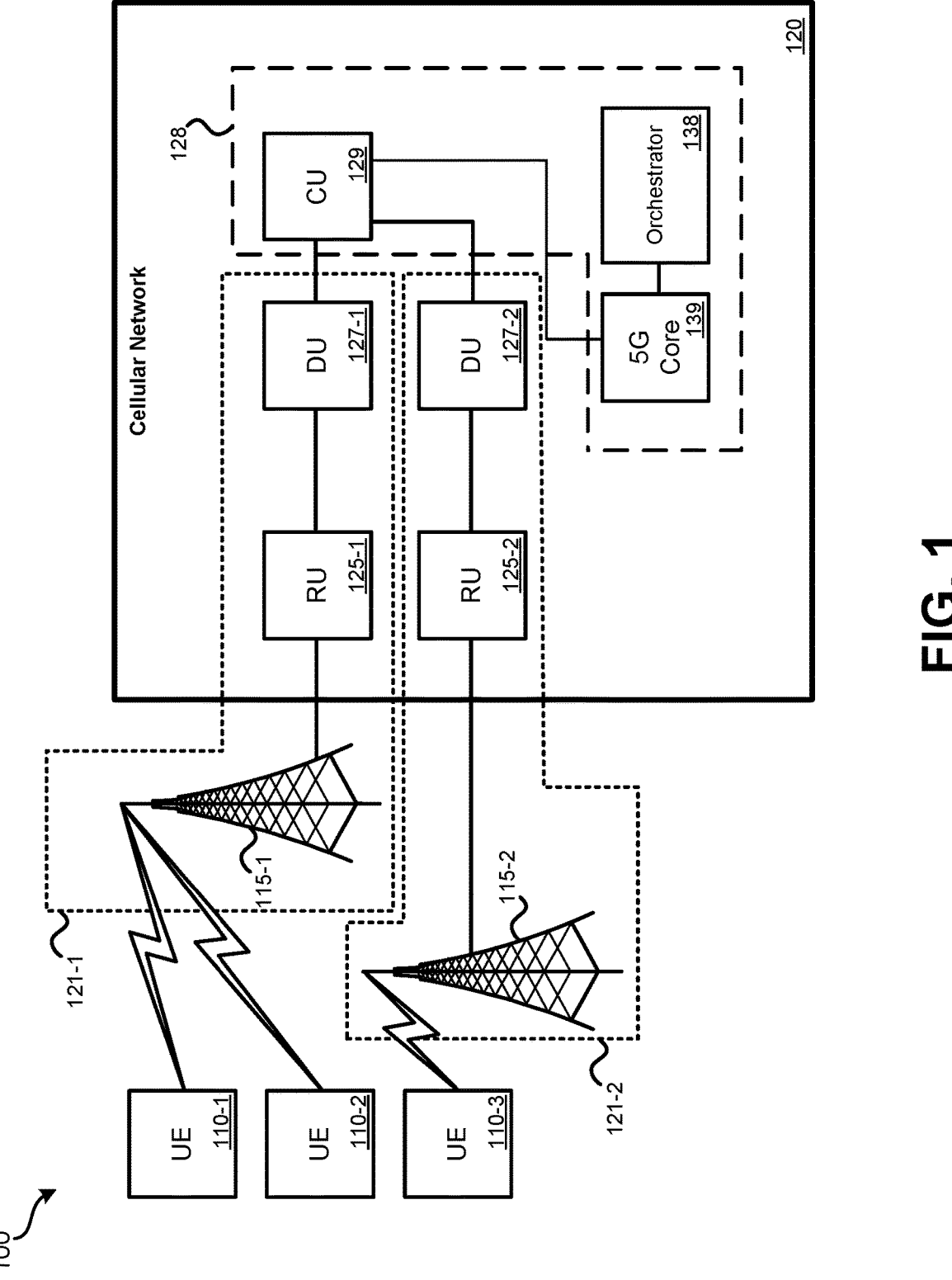
FIG. 1 illustrates an embodiment of a hybrid-cloud cellular network.

A user plane function (UPF) resides within a core of a cellular network, such as the core of a 5G New Radio (NR) cellular network. The UPF serves as a gateway for network traffic between user equipment (UE) residing on the cellular network and an external network, which may be the Internet. A user of a UE connected with the cellular network may use the UE to access webpages or other services that are accessible via the Internet. Such services and applications can include: voice services and applications; video services and applications; gaming services and applications; communication services and applications; business services and applications; and emergency services and applications.

It may be beneficial to analyze communication traffic passing through the UPF and possibly perform some action, such as applying a policy to the traffic or the UE associated with the traffic, based upon the analysis. Not all traffic for a UE (uplink traffic and/or downlink traffic) is legitimate or secure. Therefore, situations may exist when particular traffic should be blocked, such as traffic that is suspicious, such as traffic that is possibly part of a distributed denial-of-service (DDOS) attack. As another example, particular applications and services may have varying needs in order to function sufficiently for a user of the UE to have a sufficient QoE. For example, a particular video chat application may require that particular latency requirements be met in order for a user to have an acceptable QoE.

As detailed herein, a service can be implemented that causes an NEF to query a UPF to obtain the cellular network address associated with a public IP address used for communication for the UE outside of the cellular network. Additionally, the UPF of a cellular network can be configured to output particular information relevant to UE, security and/or QoE for applications and services, for example, so that security and/or QoE for applications and services can be improved. The UPF can additionally or alternatively be configured to output QoS parameters for communication traffic for a particular UE through the UPF or communication traffic for a particular application or service being used by UE through the UPF.

Embodiments detailed herein can involve a traffic analysis gateway (TAG) that analyzes communication traffic passing through the UPF. Such analysis can involve deep packet inspection (DPI). Based upon an event being detected (e.g., suspicious or excessive traffic for a UE, a particular application or service being used by the UE), the TAG may obtain data from the UPF that indicates a mapping between a network address for the UE and the public address for the UE outside of the cellular network. The UPF may additionally or alternatively output QoS data to the TAG in some circumstances, such as for a particular application or service. The TAG can then determine whether a particular policy should be applied internally on the cellular network for the UE generally, application-specific traffic for the UE, or service-specific traffic for the UE. The internal policy applied within the cellular network can perform various purposes. For example, the UE may be reassigned to a cellular network slice with higher security; data associated with the application or service may receive higher than normal priority on the cellular network, or some other action can be performed.

Further detail regarding such embodiments is provided in relation to the figures. The implementations detailed herein can be implemented on a hardware-based cellular network. A hardware-based cellular network can use specialized or general-purpose computing hardware maintained directly by the cellular network provider to provide cellular services. Alternatively, implementations detailed herein can be performed on a hybrid-cloud cellular network, such as detailed in relation to FIG. 1.

The core of a 5G New Radio (NR) cellular network can employ a service-based architecture (SBA) using a service-based interface. At the core of most modern networks and services is typically a cloud- and virtualization-based platform. This is also the case for 5G networks. A cloud- and virtualized platform can be programmable and can allow many different functions to be built, configured, connected, and deployed at the scale that is needed at the given time.

The 3rd Generation Partnership Project (3GPP) defines an SBA whereby the control plane functionality and common data repositories of a 5G NR network are delivered by way of a set of interconnected network functions (NFs), each with authorization to access each other's services. SBAs can provide a modular framework from which common applications can be deployed using components of varying sources and suppliers. The service-based interface can function based on API calls.

FIG. 1 illustrates a block diagram of a hybrid cellular network system ("system 100"). Such a hybrid cellular network system is partially implemented using specialized hardware and partially implemented using virtualized cellular network components on a cloud-computing platform, such as Amazon Web Services (AWS). System 100 can include a 5G New Radio (NR) cellular network; as noted, other types of cellular networks, such as 6G, 7G, etc., may also be possible. System 100 can include: UE 110 (UE 110-1, UE 110-2, UE 110-3); structure 115; cellular network 120; radio units 125 ("RUs 125"); distributed units 127 ("DUs 127"); centralized unit 129 ("CU 129"); 5G core 139; and orchestrator 138. FIG. 1 represents a component-level view. In a virtualized open radio access network (O-RAN), because components can be implemented as specialized software executed on general-purpose hardware, except for components that need to receive and transmit RF, the functionality of the various components can be executed by general-purpose servers. For at least some components, the hardware may be maintained by a separate cloud-service computing platform provider. Therefore, the cellular network operator may operate some hardware, such as base stations that include RUs and local computing resources on which DUs are executed, such components may be connected with a cloud-computing platform on which other cellular network functions (NFs), such as the cellular network core and higher-level RAN components, such as CUs, are executed.

UE 110 can represent various types of end-user devices, such as cellular phones, smartphones, cellular modems, cellular-enabled computerized devices, sensor devices, robotic equipment, IoT devices, gaming devices, access points (APs), or any computerized device capable of communicating via a cellular network. More generally, UE can represent any type of device that has an incorporated 5G interface, such as a 5G modem. Examples can include sensor devices, Internet of Things (IoT) devices, manufacturing robots, unmanned aerial (or land-based) vehicles, network-connected vehicles, etc. Depending on the location of individual UEs, UE 110 may use RF to communicate with various BSs of cellular network 120. As illustrated, two BSs are illustrated; BS 121-1 can include: structure 115-1, RU 125-1, and DU 127-1. Structure 115-1 may be any structure to which one or more antennas (not illustrated) of the BS are mounted. Structure 115-1 may be a dedicated cellular tower, a building, a water tower, or any other man-made or natural structure to which one or more antennas can reasonably be mounted to provide cellular coverage to a geographic area. Similarly, BS 121-2 can include: structure 115-2, RU 125-2, and DU 127-2.

Real-world implementations of system 100 can include many (e.g., thousands) of BSs and many CUs and 5G core 139. BS 121-1 can include one or more antennas that allow RUs 125 to communicate wirelessly with UEs 110. RUs 125 can represent an edge of cellular network 120 where data is transitioned to RF for wireless communication. The radio access technology (RAT) used by RU 125 may be 5G NR, or some other RAT. The remainder of cellular network 120 may be based on an exclusive 5G architecture, a hybrid 4G/5G architecture, or some other cellular network architecture that supports cellular network slices. BS 121 may include an RU (e.g., RU 125-1) and a DU (e.g., DU 127-1).

One or more RUs, such as RU 125-1, may communicate with DU 127-1. As an example, at a possible cell site, three RUs may be present, each connected with the same DU. Different RUs may be present for different portions of the spectrum. For instance, a first RU may operate on the spectrum in the citizens broadcast radio service (CBRS) band while a second RU may operate on a separate portion of the spectrum, such as, for example, band 71. In some embodiments, an RU can also operate on three bands. One or more DUs, such as DU 127-1, may communicate with CU 129. Collectively, an RU, DU, and CU create a gNodeB, which serves as the radio access network (RAN) of cellular network 120. DUs 127 and CU 129 can communicate with 5G core 139. The specific architecture of cellular network 120 can vary by embodiment. Edge cloud server systems (not illustrated) outside of cellular network 120 may communicate, either directly, via the Internet, or via some other network, with components of cellular network 120. For example, DU 127-1 may be able to communicate with an edge cloud server system without routing data through CU 129 or 5G core 139. Other DUs may or may not have this capability.

While FIG. 1 illustrates various components of cellular network 120, other embodiments of cellular network 120 can vary the arrangement, communication paths, and specific components of cellular network 120. While RU 125 may include specialized radio access componentry to enable wireless communication with UE 110, other components of cellular network 120 may be implemented using either specialized hardware, specialized firmware, and/or specialized software executed on a general-purpose server system. In a virtualized arrangement, specialized software on general-purpose hardware may be used to perform the functions of components such as DU 127, CU 129, and 5G core 139. Functionality of such components can be co-located or located at disparate physical server systems. For example, certain components of 5G core 139 may be co-located with components of CU 129.

In a possible virtualized implementation, CU 129, 5G core 139, and/or orchestrator 138 can be implemented virtually as software being executed by general-purpose computing equipment on public cloud-computing platform 128, as detailed herein. Therefore, depending on needs, the functionality of a CU, and/or 5G core may be implemented locally to each other and/or specific functions of any given component can be performed by physically separated server systems (e.g., at different server farms). For example, some functions of a CU may be located at a same server facility as where 5G core 139 is executed, while other functions are executed at a separate server system or on a separate cloud computing system. In the illustrated embodiment of system 100, cloud-computing platform 128 can execute CU 129, 5G core 139, and orchestrator 138. The cloud-computing platform 128 can be a third-party cloud-based computing platform or a cloud-based computing platform operated by the same entity that operates the RAN. Cloud-based computing platform 128 may have the ability to devote additional hardware resources to cloud-based cellular network components or implement additional instances of such components when requested.

Kubernetes, Docker®, or some other container orchestration platform, can be used to create and destroy the logical CU or 5G core units and subunits as needed for the cellular network 120 to function properly. Kubernetes allows for container deployment, scaling, and management. As an example, if cellular traffic increases substantially in a region, an additional logical CU or components of a CU may be deployed in a data center near where the traffic is occurring without any new hardware being deployed. (Rather, processing and storage capabilities of the data center would be devoted to the needed functions.) When the need for the logical CU or subcomponents of the CU no longer exists, Kubernetes can allow for removal of the logical CU. Kubernetes can also be used to control the flow of data (e.g., messages) and inject a flow of data to various components. This arrangement can allow for the modification of nominal behavior of various layers.

The deployment, scaling, and management of such virtualized components can be managed by orchestrator 138. Orchestrator 138 can represent various software processes executed by underlying computer hardware. Orchestrator 138 can monitor cellular network 120 and determine the amount and location at which cellular network functions should be deployed to meet or attempt to meet service level agreements (SLAs) across slices of the cellular network.

Orchestrator 138 can allow for the instantiation of new cloud-based components of cellular network 120. As an example, to instantiate a new CU for test, orchestrator 138 can perform a pipeline of calling the CU code from a software repository incorporated as part of, or separate from cellular network 120, pulling corresponding configuration files (e.g. helm charts), creating Kubernetes nodes/pods, loading CU containers, configuring the CU, and activating other support functions (e.g. Prometheus, instances/connections to test tools).

As previously noted, a cellular network slice functions as a virtual network operating on an underlying physical cellular network. Operating on cellular network 120 is some number of cellular network slices, such as hundreds or thousands of network slices. Communication bandwidth and computing resources of the underlying physical network can be reserved for individual network slices, thus allowing the individual network slices to reliably meet defined SLA requirements. By controlling the location and amount of computing and communication resources allocated to a network slice, the QoS and QoE for UE can be varied on different slices. A network slice can be configured to provide sufficient resources for a particular application to be properly executed and delivered (e.g., gaming services, video services, voice services, location services, sensor reporting services, data services, etc.). However, resources are not infinite, so allocation of an excess of resources to a particular UE group and/or application may be desired to be avoided. Further, a cost may be attached to cellular slices: the greater the amount of resources dedicated, the greater the cost to the user; thus, optimization between performance and cost is desirable.

Particular parameters that can be set for a cellular network slice can include: uplink bandwidth per UE; downlink bandwidth per UE; aggregate uplink bandwidth for a client; aggregate downlink bandwidth for the client; maximum latency; access to particular services; and maximum permissible jitter.

Particular network slices may only be reserved in particular geographic regions. For instance, a first set of network slices may be present at RU 125-1 and DU 127-1, and a second set of network slices, which may only partially overlap or may be wholly different from the first set, may be reserved at RU 125-2 and DU 127-2.

Further, particular cellular network slices may include multiple defined slice layers. Each layer within a network slice may be used to define parameters and other network configurations for particular types of data. For instance, high-priority data sent by a UE may be mapped to a layer having relatively higher QoS parameters and network configurations than lower-priority data sent by the UE that is mapped to a second layer having relatively less stringent QoS parameters and different network configurations.

Components such as DUs 127, CU 129, orchestrator 138, and 5G core 139 may include various software components that are required to communicate with each other, handle large volumes of data traffic, and are able to properly respond to changes in the network. In order to ensure not only the functionality and interoperability of such components, but also the ability to respond to changing network conditions and the ability to meet or perform above vendor specifications, significant testing must be performed.

Figure 2A:
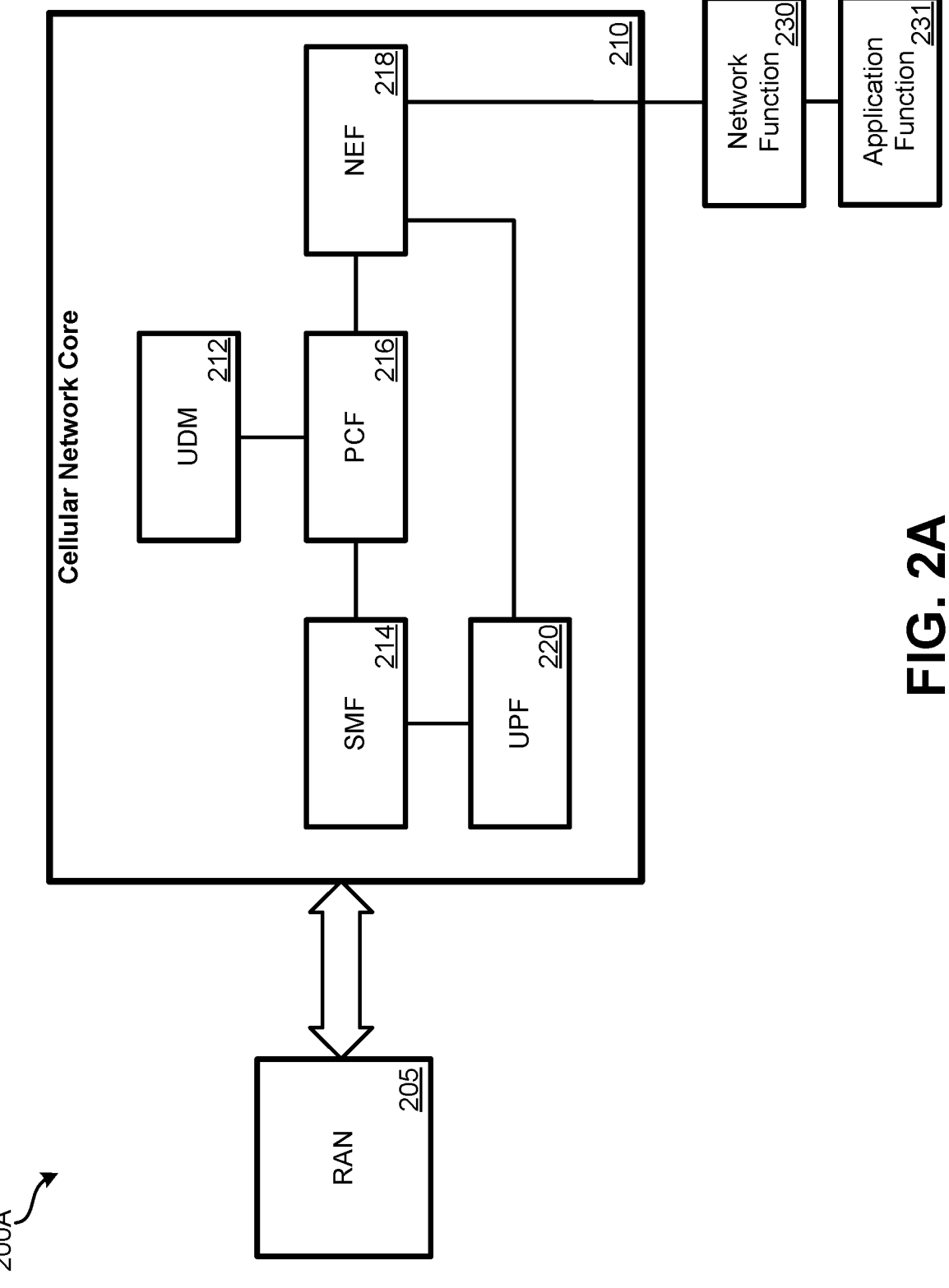
FIG. 2A illustrates an embodiment of a system that includes a cellular network core that exposes data from the user plane function (UPF) to a network function residing outside of a cellular network.

FIG. 2A illustrates an embodiment of a cellular network system 200A ("system 200A") that includes a cellular network core that exposes data from the user plane function (UPF) to a network function residing outside of cellular network core 210 and, possibly, outside of the cellular network. A network function can refer to a computerized function that interacts with data stored by and/or created by components of the cellular network. Core 210 can represent an embodiment of 5G core 139 of FIG. 1. Core 210 can include: Unified Data Management 212 ("UDM 212"); Session Management Function 214 ("SMF 214"); Policy Control Function 216 ("PCF 216"); Network Exposure Function 218 ("NEF 218"); and UPF 220. UDM 212 is a network function that manages access authorization, user registration, and roaming access. SMF 214 manages interactions on the data plane, creation and removal of protocol data unit sessions and managing session context with the UPF. PCF 216 governs control plane functions and the UPF via defined policy rules. NEF 218 facilitates exposure of network services and capabilities to trusted components outside of the cellular network core. NEF 218 can act as a consolidated application programming interface (API) for components of core 210. Via NEF 218, permissions and access to data from core components, including UPF 220, can be controlled. NEF 218 can provide for application functions to securely provide information to a 3GPP network. In this case, the NEF may authenticate, authorize, and/or assist in throttling application functions.

UPF 220 is responsible for packet routing and forwarding between external networks from the cellular network (e.g., Internet 240) and UE communicating with RAN 205 of the cellular network. RAN 205 can represent BSs 121 of cellular network 120 of FIG. 1. UPF 220 functions as a gateway in that cellular network addressed traffic inside of core 210 and RAN 205 is translated to have an external IP address appropriate for communication via Internet 240. From the perspective of a UE, all inbound and outbound Internet communications flows through UPF 220.

In system 200A, network function (NF) 230 resides outside of core 210. Network function 230 may be any form of network function that interacts with IP addresses used for data communication outside of the cellular network. An example of such a network function is provided in relation to FIG. 2B. In FIG. 2A, network function 230 may need the private IP address (also referred to as a cellular network address) used within the cellular network that is mapped to the public IP address used outside of the cellular network. As an example, when a UE requests a website, UPF 220 modifies the request to include a different, external (also referred to as public) IP address that is used for transmitting the request outside of the cellular network and core 210. As such, the private IP address used within the cellular network and core 210 remains obscured to the website and any other intercepting party outside of the cellular network. As shown in FIG. 2A, application function (AF) 231 may be present. While NF 230 can be operated by the cellular network operator, AF 231 may be operated by a separate party. NF 230 may determine whether AF 231 is permitted to request the internal cellular network address.

Via NEF 218, network function 230 can request the private IP address of a UE. Network function 230 may transmit a request to NEF 218 that includes: 1) the public IP address associated with the desired private IP address; and, possibly, 2) a port. This request may be transmitted to NEF 218. NEF 218 may then determine if network function 230 is authorized to perform such a request. If authorized, NEF 218 may then transmit the public IP address (and port) to UPF 220. In response, the UPF may look up the associated private IP address and provide the private IP address to NEF 218. NEF 218 may then provide a response to network function 230 that indicates the private IP address of the UE. In some embodiments, UPF 220 can also provide an indication of IP domain to NEF 218, which can then be output to network function 230.

In some embodiments, network function 230 may have access to additional data that can be included in the request. The additional data can include: an IP domain; an indication of the data network name (DNN); and/or the S-NSSAI (Single Network Slice Selection Assistance Information). A cellular network can include multiple instances of UPFs. At a given time, a particular UPF instance may handle the communications for a given UE. This additional data can be used by NEF 218 to route the request to the correct UPF instance that is handling UPF functionality for the UE, such as if multiple UPF instances can allocate IP addresses within the same external IP range. As an example, NF 230 may have access to data from a stored service level agreement (SLA) that defines a relationship between an application function making a request and a corresponding DNN and/or S-NSSAI. Therefore, based on a look-up, the DNN and/or S-NSSAI can be determined based on the AF from which the request originated.

Figure 2B:
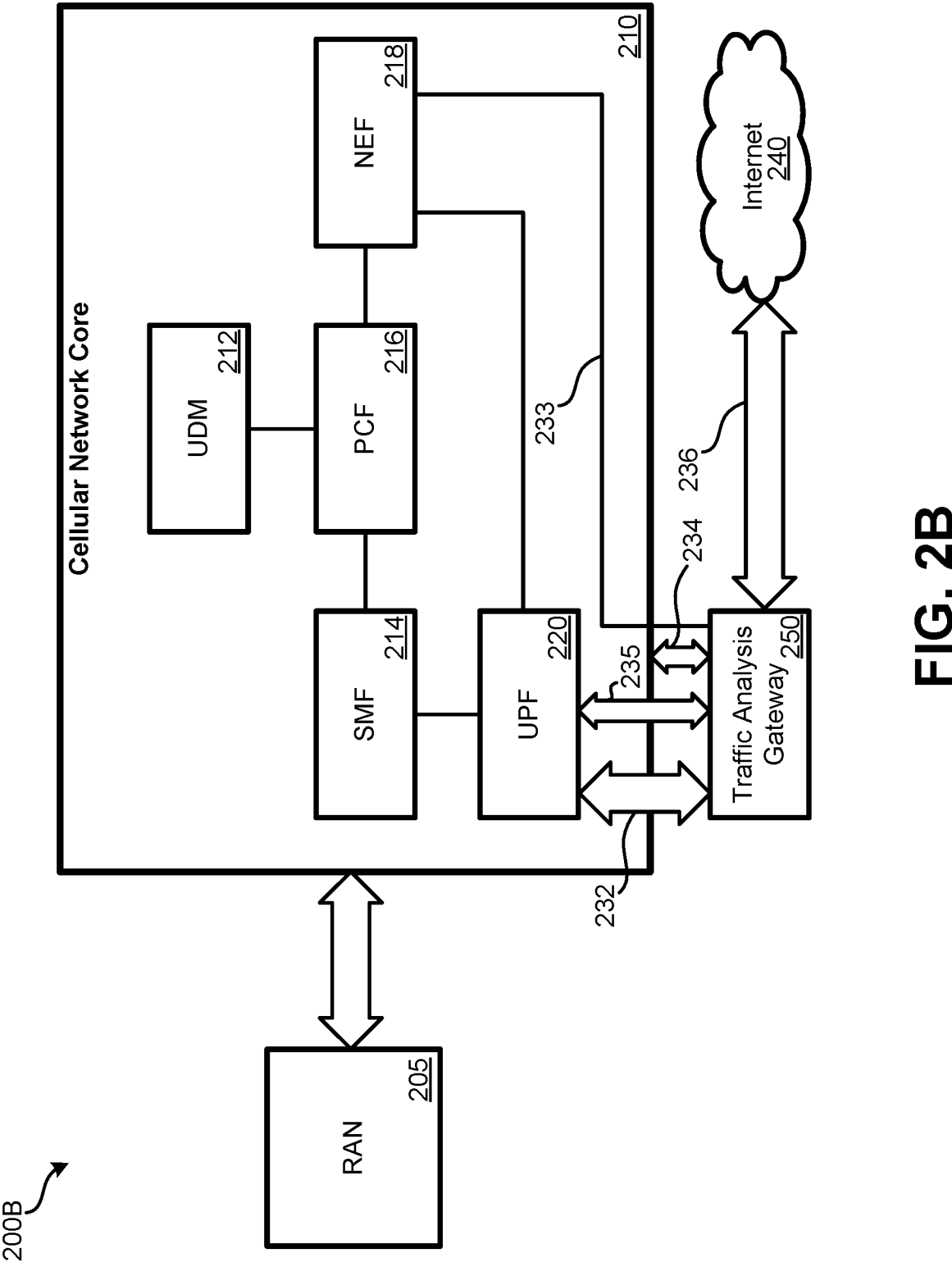
FIG. 2B illustrates an embodiment of a system that includes a cellular network core that exposes data from the UPF.

FIG. 2B illustrates an embodiment of a cellular network system 200B ("system 200B") that includes a cellular network core that exposes data from UPF 220. Core 210 can represent an embodiment of 5G core 139 of FIG. 1. UPF 220 is responsible for packet routing and forwarding between external networks from the cellular network (e.g., Internet 240) and UE communicating with RAN 205 of the cellular network. RAN 205 can represent BSs 121 of cellular network 120 of FIG. 1. UPF 220 functions as a gateway in that cellular network addressed traffic inside of core 210 and RAN 205 is translated to have an external IP address appropriate for communication via Internet 240. From the perspective of a UE, all inbound and outbound Internet communications flows through UPF 220. Therefore, by monitoring data passing through UPF 220, the Internet traffic for all UE using the cellular network for Internet access can be monitored.

Figure 3:
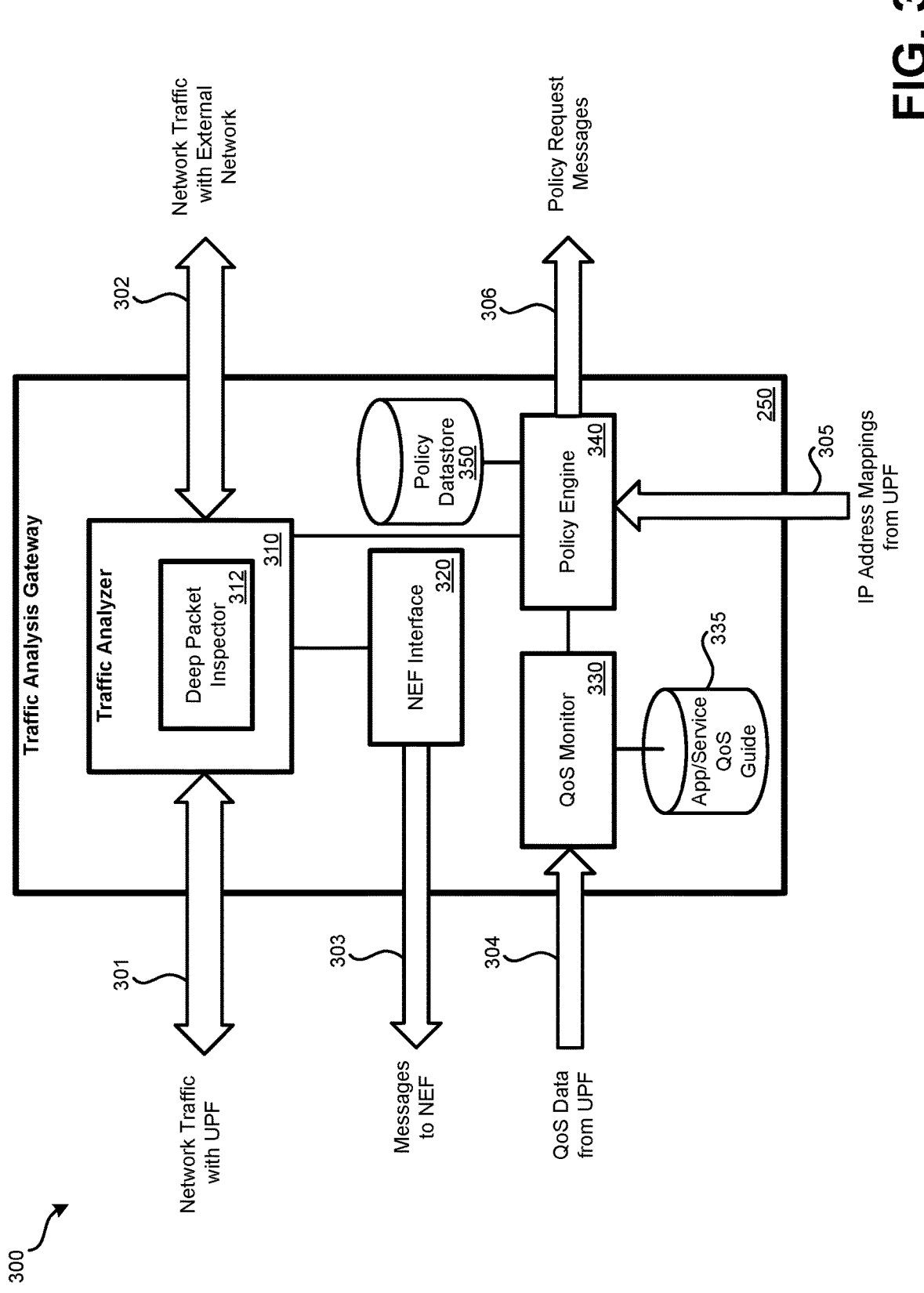
FIG. 3 illustrates an embodiment of a traffic analysis gateway.

In system 200B, TAG 250, which is an example of an application function and is detailed in relation to FIG. 3, is present. TAG 250 monitors inbound and/or outbound communication traffic between UPF 220 and Internet 240. TAG 250 may be positioned between UPF 220 and Internet 240 such that Internet traffic inbound and outbound from UPF 220 passes through TAG 250. Internet traffic 236 and internet traffic 232 can have external IP addresses attached. Without information from UPF 220, TAG 250 may be unable to determine which UE on the cellular network or cellular network address that is associated with the external IP address. Inbound and/or outbound communication traffic may be analyzed by TAG 250. Based on an event being detected in traffic associated with a particular external IP address, traffic analysis gateway may transmit a request 233 for access to UPF data to NEF 218. This request can indicate the external IP address for which the event was detected. This request can be in the form of an API call. If NEF 218 approves the request, NEF 218 transmits a message, which can include the external IP address for which the event was detected, to UPF 220 that causes UPF data 235 to be output to TAG 250, either directly or via NEF 218. UPF data 235 can be an indication of the corresponding cellular network address (private IP address). Additionally or alternatively, UPF data 235 can include various pieces of information, such as: 1) a mapping of the external IP address to a cellular network address for the UE; and 2) one-time, occasional, or periodic direct reporting of QoS monitoring events (DRQOS). UPF data 235 can be transmitted by UPF 220 to TAG 250 by virtue of permission being granted to UPF 220 via NEF 218; alternatively, data may be transmitted by UPF 220 to TAG 250 via NEF 218. Data from UPF 220 can be transmitted in the form of an API call.

Depending on the type of event detected, TAG 250 can take various actions. If a security event has been detected, such as inbound or outbound data being associated with a DDOS attack, virus, or some other security event, TAG 250 may block inbound and/or outbound traffic associated with the UE. TAG 250 can send core 210 policy request 234. Policy request 234 may request that a policy be applied to a particular cellular network address (and, therefore, for a particular UE). The policy request may request that a policy be applied that: included increases security; isolates the UE's traffic on a designated slice; causes one or more NFs to not be available; causes one or more additional NFs to be used; decreases the uplink and/or downlink bandwidth provided to the UE; and/or some other action.

If the event detected is the use of some particular service or application, TAG 250 may use the DRQOS to determine if a policy should be applied that alters the QoS provided to the UE on the cellular network. For example, the particular services or applications that may be monitored for can include various over-the-top (OTT) communication services, such as Skype, WhatsApp, media streaming services (e.g., Spotify, Tidal, Netflix, Disney+, AppleTV, Prime Video, etc.). Depending on the DRQOS data, if one or more thresholds are triggered (e.g., uplink bandwidth, downlink bandwidth, jitter, uplink packet delay, downlink packet delay, and/or roundtrip packet delay between the UPF and UE on the cellular network exceeding defined threshold values), a policy may be applied to the cellular network address (and, thus, the UE) for which the event was detected that helps improve performance for the application or service. Such thresholds may be particular to the application or service and may have been defined by the application provider, service provider, or cellular network operator. The policy may generally improve performance for all traffic for the UE or only traffic associated with the particular service or application. In some arrangements, such a policy may instead be used to decrease performance for a particular service or application, such as a service or application that the cellular network operator wants to discourage users from using (e.g., downloads from sources known to host pirated material) or is perhaps associated with security vulnerabilities (e.g., downloads from sources known to host viruses).

As an example, TAG 250 may analyze internet traffic associated with a particular external IP address. Based on the analysis, TAG 250 may determine that the traffic is associated with a particular gaming service (e.g., based on the IP address to which data is being sent by the UE, such as a target IP address of an application server). TAG 250 may send a request indicating the external IP address to NEF 218 along with an indication that TAG 250 is requesting DRQOS data, which may in turn approve and send the request to UPF 220. UPF 220 may then output the DRQOS data to TAG 250 along with, possibly, a mapping between the external IP address and a cellular network address. Depending on the DRQOS data, TAG 250 may or may not request core 210 to apply a particular policy to the cellular network address. As another example, TAG 250 can determine whether network address translation (NAT) may be needed.

As another example, TAG 250 may analyze outbound internet traffic associated with a particular external IP address. Based on the analysis, TAG 250 may determine that the traffic is related to a security event. TAG 250 may send a request indicating the external IP address to NEF 218 along with an indication that TAG 250 is requesting an IP mapping. NEF 218 may in turn approve and send the request to UPF 220. UPF 220 may then output the mapping between the external IP address and a cellular network address. TAG 250 may then send policy request 234 requesting that a particular policy be applied to the cellular network address mapped to the external IP address for which the security event was detected.

In some embodiments, based on policy request 234, a message may be transmitted to and output by the UE that acts as a report to the user. For example, if a UE or cellular network address of the UE is determined to be involved in a DDOS attack, the UE may be caused to present a message that indicates as such and recommend steps for the user of the UE to take. If a policy is applied to improve performance for a particular application, a message may be output to the UE that indicates that a policy has been applied to improve the QoE for the particular application.

FIG. 3 illustrates an embodiment 300 of TAG 250 with various data traffic. TAG 250 can include: traffic analyzer 310; NEF interface 320; QoS monitor 330; Application/ Service QoS Guide 335; policy engine 340; and policy datastore 350. Components of TAG 250 may include one or more special-purpose or general-purpose processors. Such special-purpose processors may include processors that are specifically designed to perform the functions of the components detailed herein. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums, such as random-access memory (RAM), flash memory, a hard disk drive (HDD), or a solid-state drive (SSD). Further, the functions of the components of TAG 250 can be implemented using a cloud-computing platform, which is operated by a separate cloud-service provider that executes code and provides storage for clients. For example, as detailed in relation to FIG. 1, TAG 250 can be implemented on the cloud-computing platform that hosts 5G core 139.

Traffic analyzer 310 may analyze inbound and/or outbound traffic between a UPF and an external network, such as the Internet. Therefore, traffic 301 may be exchanged with a UPF and traffic 302 may be exchanged with the external network. In some embodiments, DPI may be performed by deep packet inspector 312 to determine a particular service or application corresponding to traffic. Such DPI may also be beneficial for analyzing security risks. Some forms of analysis that may be performed by traffic analyzer 310 can include: monitoring inbound data volumes for an external IP address; monitoring outbound data volumes for the external IP address; monitoring addresses to which data is being transmitted to and/or received from.

NEF interface 320 can serve to send messages 303 or requests for data to the NEF of the cellular network core. These messages can include data such as: 1) the type of data requested (e.g., DRQOS data, IP mapping data); 2) the external IP address for which the data is requested; and possibly 3) a time duration for which the data should be provided. In response to the NEF approving the request, the UPF may be triggered to output QoS data 304 to QoS monitor 330.

QoS monitor 330 may analyze QoS data 304 received from the UPF and compare such data with corresponding thresholds in App/Service QoS Guide 335. App/Service QoS Guide 335 may be organized such that particular thresholds (or other forms of performance parameters) are mapped to particular services or applications. The particular threshold relevant to the one or more applications or services for which the QoS data is received from the UPF may be compared with the QoS data by QoS monitor 330. If the comparison indicates that a policy should be applied to improve (or decrease) performance, policy engine 340 may be triggered to do so.

Policy engine 340 may cause the cellular network core to apply one or more policies to a particular internal cellular network address (which would apply to a particular UE). A policy request message 306 may indicate: 1) the cellular network address to which the policy should be applied; 2) an identifier of the policy or parameters of the policy to apply; and possibly 3) an amount of time for which the policy should be applied. Such policy request messages 306 may be transmitted to the cellular network core.

Policy engine 340 may receive or otherwise be able to access IP address mappings received from the UPF. IP address mapping 305 can indicate the cellular network address mapped to a particular external IP address. While traffic analyzer 310 may detect events associated with external IP addresses, policies may be applied by the cellular network core to cellular network addresses; therefore, when a policy request message 306 is sent to the cellular network core, the correct cellular network address may need to be indicated.

Policy engine 340 based on a trigger from QoS monitor 330 and/or an indication of the type of event detected for the external network address from traffic analyzer 310 may cause a policy, as indicated in policy datastore 350, to be applied by sending policy request message 306. In some situations, such as for a security event, QoS data may not be relevant; therefore, policy engine 340 may only need the correct cellular network address for which a policy should be applied. Policies in policy datastore 350 may be indicated by an identifier (or parameters) and the circumstances under which the policy should be applied. For example, a policy may be applied based on a particular type of event (e.g., a security event) being detected by traffic analyzer 310. As another example, a particular policy from policy datastore 350 may be applied by policy engine 340 when triggered by QoS monitor 330 for a particular service or application.

Such a policy may be defined to remedy QoE issues for the particular service or application based on QoS parameters not being met.

Various methods may be performed using the systems and arrangements of FIGS. 1-3. FIG. 4A illustrates an embodiment of a method 400A for exposing an internal cellular network address from the UPF to a network function residing outside the cellular network core (and, possibly, cellular network). Method 400A may be performed using a network function, such as detailed in relation to FIG. 2A.

At block 401, a request may be transmitted by a network function residing outside of the cellular network core (or outside of the cellular network) to the NEF of the cellular network that indicates that a cellular network address (e.g., private IP address) from the UPF is requested. This request can indicate the external IP address for which the corresponding private IP address from the UPF is requested. The NEF can approve or deny this request at block 402, such as based on the external IP address and whether the network function is authorized to make such a request. At block 403, if approved, the NEF can transmit the request to the UPF. In some embodiments, additional optional data, such as the IP domain, DNN, and/or S-NSSAI may be used to determine the correct instance of the UPF of the cellular network to which the request should be routed.

At block 404, in response to the request, the UPF may provide an indication of the cellular network address corresponding to the external IP address of the UE.

FIG. 4B illustrates an embodiment of a method 400B for exposing and using data from the UPF. Method 400B may be performed using a TAG, such as detailed in relation to FIGS. 2B and 3, along with a UPF that is configured to output IP mapping data and, possibly, QoS data.

At block 405, external communications between a UPF and a network (inbound for the UPF and/or outbound from the UPF), such as the Internet, are received. The external communications are analyzed, possibly using DPI, at block 410. Block 410 can include one or more events being detected. An event can include: a security event; a particular type of security event; a particular service being used; and/or a particular application being used.

At block 415, in response to the event of block 410, a request may be transmitted by the TAG to the NEF of the cellular network indicating that data from the UPF is requested. This request can indicate the external IP address for which data from the UPF is requested and may indicate whether QoS data is requested. The NEF can approve or deny this request. If approved, the UPF may be triggered by the NEF to fulfill the request at block 420.

At block 425, in response to the UPF being triggered, the UPF may provide a mapping between the external IP address, which may have been indicated in the triggering request to the UPF from the NEF, and a cellular network address to the TAG that transmitted the request at block 415. Additionally, if requested, at block 430, DRQOS data for the cellular network address (which corresponds to a particular UE) may be output to the TAG. This DRQOS data may only correspond to a particular service or application, or alternatively may apply to all traffic passing through the UPF for the cellular network address.

At block 435, the TAG may trigger one or more policies to be applied to the cellular network address based on the event detected at block 410 and/or a comparison between the DRQOS data received at block 430 and QoS parameter thresholds particular to the service or application being used by the UE. The policy may be set by the TAG sending a policy message to the cellular network core that either indicates the particular parameters of the policy to be applied or includes an identification of the policy to be applied (and the actual policy may be retrieved from some other source by the cellular network core). Alternatively, the policy may be applied by some component in communication with the cellular network external to the core.

Following block 435, the UE may continue to access the service or application while the UE's access to the cellular network is controlled in accordance with the applied policy. In some situations, such as for a security event, the policy may include a complete quarantine or block of the UE from accessing the external network. In some embodiments, a notification may be output by the UE indicating the policy applied and/or event that occurred.

Figure 5:
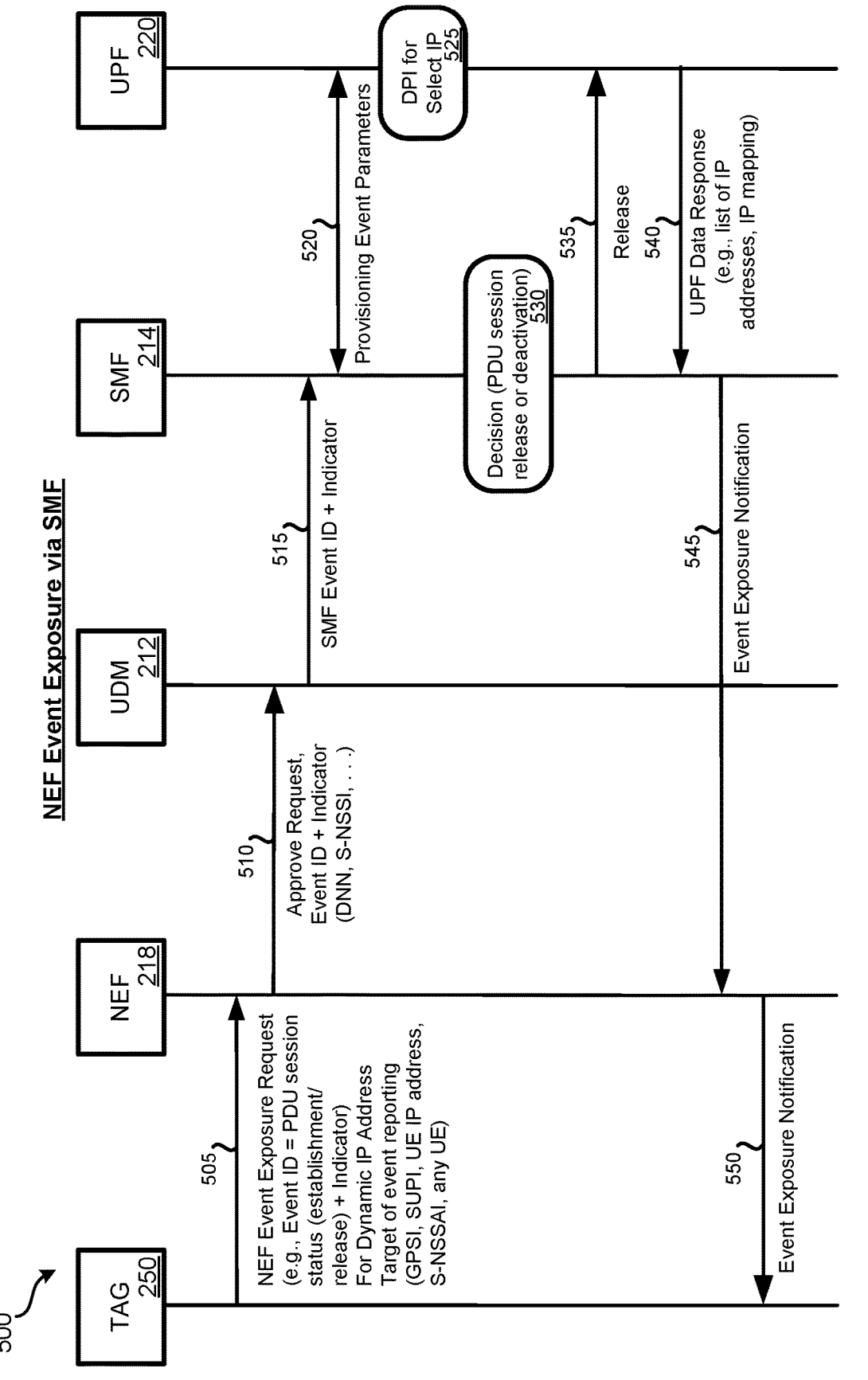
FIG. 5 illustrates an operation flow diagram corresponding to an embodiment of a method for exposing and using UPF data via the session management function (SMF).

Various methods may be performed according to various embodiments to expose new data from the UPF. For example, FIG. 5 illustrates an operation flow diagram corresponding to an embodiment of a method 500 for exposing and using UPF data via the SMF. The method 500 may use predetermined event IDs corresponding to NEF events and may be advantageous for ease of deployment in view of current systems and standards. Likewise, utilizing the SMF for NEF event exposure and UPF data may be advantageous for ease of deployment in view of current systems and standards.

As indicated by 505, the TAG 250 may communicate a request for access to UPF data to the NEF 218. For example, the request may correspond to an NEF event exposure request and may include one or more indicators. The one or more indicators may correspond to parameters specifying the event exposure request (e.g., IP address mapping information requests, DPI requests, target application/UE IP addresses, event detection criteria, and/or the like). The request may include one or more event IDs, specifying one or more events for which the TAG 250 requests access to corresponding UPF data. For example, the event may include protocol data unit (DPU) session status. This event may correspond to detecting when a PDU session is established or released for any UE, a specific UE, a group of UEs, or UEs that belong to a particular network slice. The TAG 250 request may specify the one or more external IP addresses corresponding to the one or more UEs and/or may specify parameters of the network slice of interest.

The TAG 250 may provide additional parameters, such as an indication of a need for mapping information between the one or more external IP addresses and one or more cellular network addresses of the one or more PDU sessions. In various embodiments, the TAG 250 may request one or more UE private IP addresses (e.g., internal/private cellular network addresses) with or without mapping information. The TAG 250 may specify target applications, services, addresses, and/or the like for DPI operations. The TAG 250 may further provide specifications for a DPI case for release or deactivation that may correspond to the application IP address used by the PDU session, which applications/AFs the particular UEs accessed in the PDU session (e.g., particular websites accessed, applications used, etc.), a threshold, a maximum number of IP addresses, and/or the like. As disclosed above, the TAG 250 request may include data such as: 1) the type of data requested (e.g., DRQOS data, UE private IP addresses, IP address mapping data mapping between external/public IP addresses and UE private IP addresses such as internal/private cellular network addresses); 2) the external IP address for which the data is requested; and possibly 3) a time duration for which the data should be provided. The NFs that detect the PDU session status event may correspond to the SMF and/or the UPF, and, as disclosed herein, the TAG 250 is an example of an application function.

Moreover, various embodiments may include various types of events which can be specified and used for obtaining UPF data. One event may correspond to user traffic characteristics and/or uplink data characteristics. The detection criteria for this event may specify detecting suspicious and/or excessive traffic (e.g., for a UE, a particular application or service being used by the UE), when one or more thresholds are triggered (e.g., inbound data volumes, outbound data volumes, uplink bandwidth, downlink bandwidth, jitter, uplink packet delay, downlink packet delay, and/or roundtrip packet delay between the UPF and UE), downloads from particular sources, particular destinations for data transfers, particular UE operational patterns, compromised service patterns, particularized attack patterns, particular types of access operations and/or other operations, and/or the like. Such detection criteria may be specified in the parameters of the event exposure request. The NFs that detect the event may correspond to the UPF and/or the network data analytics function (NWDAF).

Another event may correspond to NAT mapping information or, in some embodiments, a request for one or more UE private IP addresses without the mapping information. The detection criteria for this event may specify detecting, for a UE or a group of UEs, mapping information between cellular network addresses and external IP addresses, between UE private IP addresses and UE public IP addresses (e.g., IP addresses and ports), which may include Subscription Permanent Identifiers (SUPIs). Another event may correspond to UE reachability. The detection criteria for UE reachability may include detecting when the UE transitions to CM-connected state or when the UE will become reachable for paging, e.g., via a periodic registration update timer. It may indicate when the UE becomes reachable for sending downlink data to the UE. The TAG 250 may specify a maximum latency for the detection criteria. The NFs that detect the event may correspond to the access and mobility management function (AMF) and/or the UDM.

Another event may correspond to location reporting. The detection criteria for location reporting may include detecting based on event reporting information parameters (e.g., one-time reporting, maximum number of reports, maximum duration of reporting, periodicity, etc.). The location reporting may report either the current location or the last known location of a UE. The NFs that detect the event may correspond to the AMF and/or the gateway mobile location center (GMLC). Another event may correspond to roaming status. The detection criteria for this event may specify detecting based on the UE's current roaming status (the serving public land mobile network (PLMN) and/or whether the UE is in its home public land mobile network (HPLMN)) and notification is sent when that status changes. If the UE is registered via both 3GPP and N3GPP Access Type, then both instances of roaming status may be included. The NFs that detect the event may correspond to the UDM.

Another event may correspond to a communication failure. Detection criteria for this event may specify detecting when RAN or NAS level failure is detected based on connection release and it identifies a RAN/NAS release code. Another event may correspond to availability after downlink data notification failure. The detection criteria for this event may specify detecting when the UE becomes reachable again after downlink data delivery failure. When requesting availability after downlink data notification failure monitoring, the TAG 250 may additionally request an idle status indication to be included in the UE reachability event reporting. The NFs that detect the events may correspond to the AMF.

Another event may correspond to core network (CN) type change. The detection criteria for this event may specify detecting when the UE moves between evolved packet core (EPC) and 5GC. It may indicate the current CN type for a UE or a group of UEs when detecting that the UE switches between being served by a Mobility Management Entity (MME) and an Access and Mobility Management Function (AMF) or when accepting the event subscription. The NFs that detect the event may correspond to the SMF. Another event may correspond to downlink data delivery status. The detection criteria for this event may specify detecting the downlink data delivery status in the core network. Events may be reported at the first occurrence of packets being buffered, transmitted or discarded, including: downlink data in extended buffering, first data packet buffered event, estimated buffering time, first downlink data transmitted event, and first downlink data discarded event. The NFs that detect the event may correspond to the SMF.

Another event may correspond to UE reachability for SMS delivery. The detection criteria for this event may specify detecting when a Short Message Service Function (SMSF) is registered for a UE and the UE is reachable as determined by the AMF and the UDM. This may enable the UE to receive an SMS. The NFs that detect the event may correspond to the UDM. Another event may correspond to number of registered UEs or established PDU Sessions. The detection criteria for this event may specify detecting the current number of registered UEs or established PDU Sessions for a network slice that is subject to Network Slice Admission Control (NSAC). For one-time reporting with an immediate reporting flag set, the NSAC function may report the number of registered UEs or established PDU sessions immediately. The NFs that detect the event may correspond to the network slice access control function (NSACF). Another event may correspond to an area of interest. The detection criteria for this event may specify detecting change of the UE presence in an area of interest. The NFs that detect the event may correspond to the AMF and/or the GMLC.

As indicated by 510, the NEF 218 may communicate a message corresponding to the request to the UDM 212. Such a message may be in response to the NEF 218 approving the request. In some embodiments, the message may be identical to the request. The message may include the event ID and the parameters of the request, which may include specifications of the detection criteria. As one example out of many, the event ID may identify PDU sessions status, and the parameters may identify the indicators for the event.

As indicated by 515, the UDM 212 may communicate a corresponding message to the SMF 214. The UDM 212 may manage access authorization and coordinate event exposure corresponding to the event ID and the parameters of the request with the SMF 214. As indicated by 520, the SMF 214 may communicate with the UPF 220 to provision the event parameters and obtain requested UPF data. For example, the UPF 220 may retrieve and provide IP mapping information, one or more UE private IP addresses with or without mapping information, and/or other UPF data corresponding to the one or more UE public IP addresses provided with the event disclosure request.

As another example, the parameters may include specifying abnormal IP address detection. As indicated by 525, DPI may be performed for select IP addresses. In various cases, the DPI may be performed based on a filter for unusual IP addresses (e.g., comparison to a user-specified or machine-learned/developed list of approved/verified/known addresses, hosts, and/or network IDs and/or of prohibited/flagged/suspicious addresses, hosts, and/or network IDs) or based on all IP addresses corresponding to the parameters and/or IP addresses related to unusual/abnormal IP addresses.

As indicated by 530, the SMF 214 may decide when and whether the PDU session should be released or deactivated. Such a decision be based on the event parameters provided with the event exposure request, which may be in accordance with the event parameters, timing parameters, etc. Thus, in some cases, the decision be based upon event detection satisfying the detection criteria according to the specified event detection requested. As indicated by 535, the SMF 214 may communicate with the UPF 220 to coordinate a release. In some cases, the SMF 214 may instruct the UPF 220 to release.

As indicated by 540, the UPF 220 may respond to the SMF 214 with the requested UPF data. For example, the response may include one or more UE private IP addresses, a list of IP addresses, IP address mapping data, etc. as disclosed herein. As indicated by 545, the SMF 214 may communicate an event exposure notification to the NEF 218. The event exposure notification may include an indication of the event and the UPF data (e.g., unusual or suspicious accesses identified based on comparison to a machine-recognition of access patterns, applications/AFs the particular UEs accessed in the PDU session, particular websites accessed, applications used, IP address mapping information, etc.), a threshold, a maximum number of IP addresses, and/or the like. In some cases, the notification may further include an indication of the PDU session release/deactivation. As indicated by 550, the NEF 218 may communicate with the TAG 250 to indicate the event exposure notification. In some embodiments, the NEF 218 may relay the event notification; in other embodiments, the NEF 218 may communicate portions of the event notification to the TAG 250.

Having obtained the UPF data, the TAG 250 may take various actions disclosed herein. For example, the TAG 250 may determine, from IP address mapping information received with the UPF data, that suspicious or unusual activity has occurred with respect to particular UEs. Accordingly, the TAG 250 may determine policies to enforce with respect to the particular UEs and may enforce those policies/service plans with respect to the UEs by communicating with the NEF based at least in part on the IP mapping information that identifies the external and/or internal cellular network IP addresses for the UEs that are to be the subject of the enforcement operations.

Figure 6:
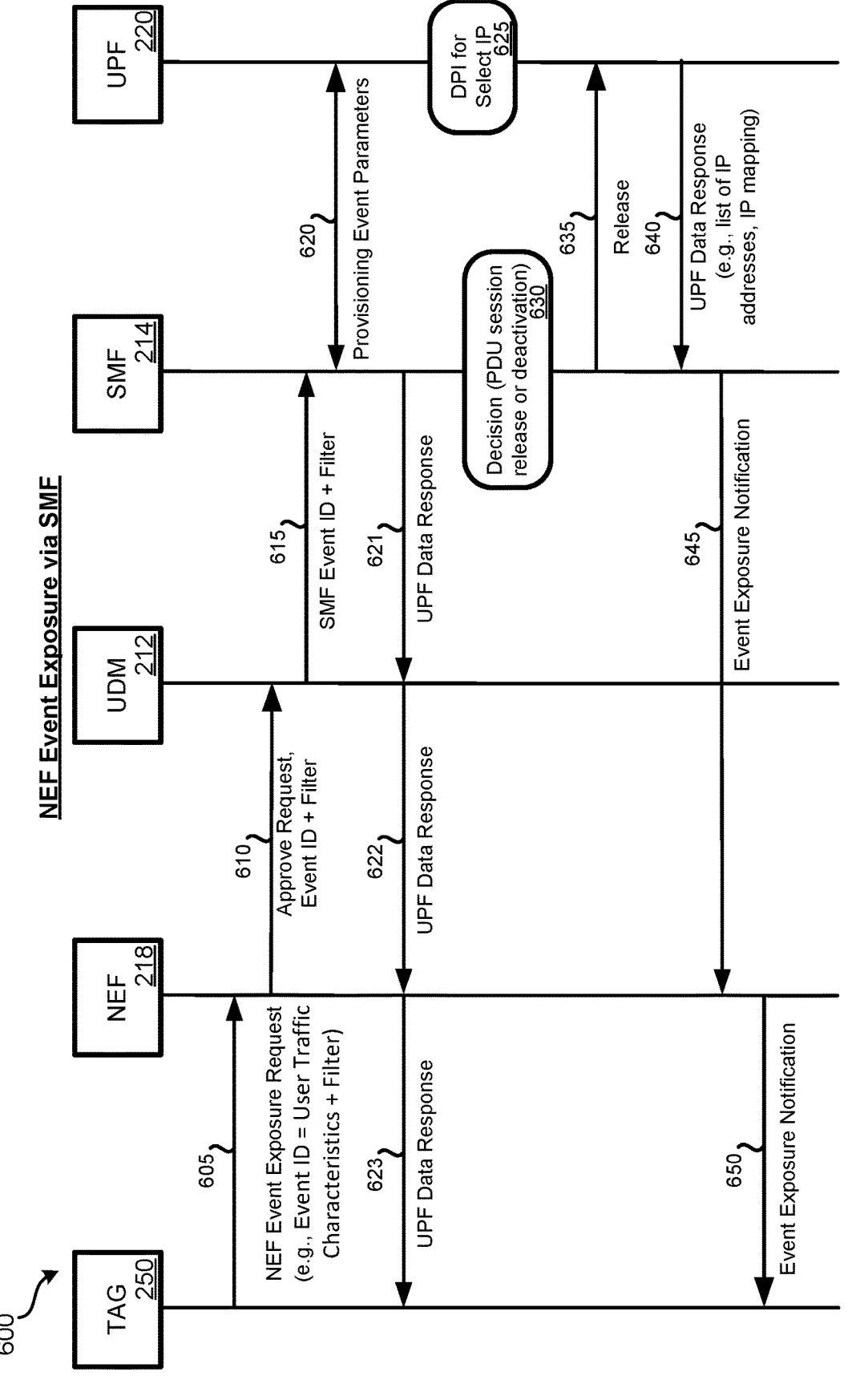
FIG. 6 illustrates an operation flow diagram corresponding to an embodiment of a method for exposing and using data from the UPF via the SMF with other event IDs.

FIG. 6 illustrates an operation flow diagram corresponding to an embodiment of a method 600 for exposing and using data from the UPF via the SMF with other event IDs. The method 600 may generally align with method 500, with features disclosed herein with respect to method 500 being likewise applicable to method 600. However, the method 600 may allow for operational flow depending on event type and may allow for use of new event IDs. For example, the method 600 may be tailored to events corresponding to user traffic characteristics and/or uplink data characteristics, NAT mapping information, UE private IP addresses with or without mapping information, and/or the like.

As indicated by 605, the TAG 250 may communicate a request for access to UPF data to the NEF 218. The request may, for example, include an event ID indicating one or more requests for user traffic characteristics, uplink data characteristics, NAT mapping information, one or more UE private IP addresses with or without mapping information, and/or the like, as disclosed herein. The request may include specifications of a filter, for example, for the user traffic characteristics of interest. The specifications of the filter may be included in the parameters of the request.

As indicated by 610, the NEF 218 may communicate a message corresponding to the request to the UDM 212, which message may be responsive to the NEF 218 approving the request. In some embodiments, the message may be identical to the request. The message may include the event ID and the parameters of the request, which may include specifications of the detection criteria (e.g., of the filter).

As indicated by 615, the UDM 212 may communicate a corresponding message to the SMF 214. As indicated by 620, the SMF 214 may communicate with the UPF 220 to provision the event parameters (e.g., specifying abnormal IP address detection) and obtain requested UPF data. As indicated by 621, 622, and 623, responses may be communicated. For example, some requested UPF data may be relayed. This may include data on the user traffic, for example. The SMF 214 may relay the responses to the UDM 212, which may in turn relay the responses to the NEF 218, which may in turn relay the responses to the TAG 250.

The remainder of the operational flow may be similar to that of method 500. As indicated by 625, DPI may be performed for select IP, such as unusual IP and, based on the filter, on all IP addresses corresponding to the parameters and/or IP addresses related to unusual/abnormal IP addresses. As indicated by 630, the SMF 214 may decide when and whether the PDU session should be released or deactivated. As indicated by 635, the SMF 214 may communicate with the UPF 220 to coordinate a release. As indicated by 640, the UPF 220 may respond to the SMF 214 with the requested UPF data. For example, the requested UPF data retrieved and provided by the UPF 220 may include IP mapping information, one or more UE private IP addresses with or without mapping information, and/or other UPF data corresponding to the one or more UE public IP addresses provided with the event disclosure request.

As indicated by 645, the SMF 214 may communicate an event exposure notification to the NEF 218. As indicated by 650, the NEF 218 may communicate with the TAG 250 to indicate the event exposure notification. Having obtained the UPF data, the TAG 250 may take various actions disclosed herein, such as determining policies to enforce with respect to the particular UEs and causing enforcement of those policies/service plans with respect to the UEs by communicating with the NEF based at least in part on the IP mapping information that identifies the external/public and/or internal/private cellular network IP addresses for the UEs that are to be the subject of the enforcement operations.

FIG. 7 illustrates an operation flow diagram corresponding to a method 700 for UPF event exposure directly from the UPF, which may or may not be via the NEF in various embodiments. Providing access to, and exposure of, NEF events and UPF data directly from the UPF or via the NEF may advantageously provide the UPF data more quickly than some other methods. The method 700 may be similar to the above-described methods in some respects, with features disclosed herein with respect to the above-described methods being likewise applicable to method 700. However, the UPF data may be provided directly from the UPF (which may be via the NEF in some embodiments) to the TAG or another AF without utilizing other NFs, which could otherwise cause delays. In some deployments, two or more of the UPF, the NEF, and the TAG may be on edges of the system (e.g., in the same geographical area) and, therefore, the UPF data may be more quickly provided directly from the UPF (via the NEF in some embodiments), as opposed to, for example, being provided via the SMF when it is a central node.

As indicated by 705, the NF 730 may communicate with the SMF 214, and PDU session information may be queried. In various embodiments, the NF 730 may correspond to one or a combination of the TAG 250, NWDAF, and/or other NFs. The NF 730 may receive information corresponding to the queried PDU session information.

As indicated by 710, the NF 730 may communicate directly with the UPF 220 to request access to UPF data. As disclosed herein, the NF 730 may specify one or more events with one or more event IDs for which the NF 730 requests access to corresponding UPF data. For example, the request may include a request for IP mapping information, a request for one or more UE private IP addresses with or without mapping information, and/or a request for DPI. As disclosed herein, a number of different types of events and parameters may be requested. Such events or parameters may include area of interest parameters, time period, additional filters (e.g., maximum number of IP addresses, all or abnormal behavior, thresholds for abnormal behavior, and/or the like), reporting filters and corresponding parameters (e.g., one-time reporting, periodic reporting, event-trigger reporting, and/or other timing parameters), and/or the like, as disclosed herein.

In some embodiments, the UPF 220 may retrieve and provide IP mapping information, one or more UE private IP addresses with or without mapping information, and/or other UPF data corresponding to the one or more UE public IP addresses provided with the event disclosure request. In some embodiments, as indicated by 715, the UPF 220 may perform DPI for select IP addresses. As disclosed herein, the DPI may be performed based on the specified filter for unusual IP addresses (e.g., comparison to a user-specified or machine-learned/developed list of approved/verified/known addresses, hosts, and/or network IDs and/or of prohibited/flagged/suspicious addresses, hosts, and/or network IDs) or based on all IP addresses corresponding to the parameters and/or IP addresses related to unusual/abnormal IP addresses. As indicated by 720, the UPF 220 may detect events satisfying the detection criteria according to the specified event detection requested.

As indicated by 725, the UPF 220 may respond to the NF 730 with the UPF data, communicating one or more event exposure notifications. Though not shown in FIG. 7, in some embodiments, the UPF 220 may communicate the UPF data to the NEF, and the NEF may respond to the NF 730 with the UPF data. As disclosed herein, the event exposure notifications may include one or more UE private IP addresses, a list of IP addresses, IP mapping data, DPI results, and/or other UPF data. Having obtained the UPF data, the NF 730 may take various actions disclosed herein, such as determining policies to enforce with respect to the particular UEs and causing enforcement of those policies/service plans with respect to the UEs by communicating to the NEF 218 and/or the SMF 214.

Figure 8:
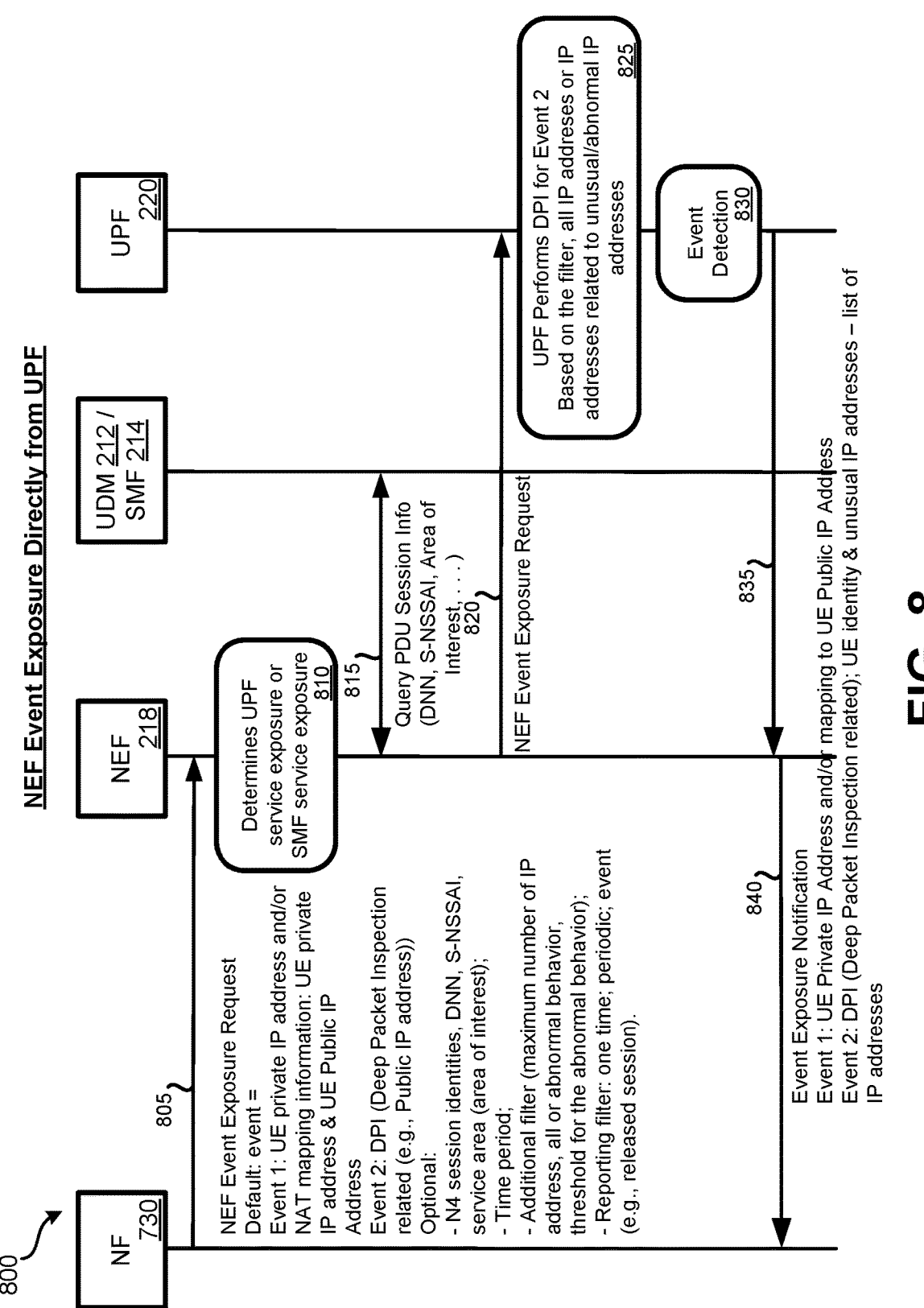
FIG. 8 illustrates an operation flow diagram corresponding to a method for network exposure function (NEF) event exposure directly from the UPF, which may or may not be via the NEF in various embodiments.

FIG. 8 illustrates an operation flow diagram corresponding to a method 800 for NEF event exposure directly from the UPF, which may or may not be via the NEF in various embodiments. The method 800 may be similar to the above-described methods in some respects, with features disclosed herein with respect to the above-described methods being likewise applicable to method 800. However, as indicated by 805, the NF 730 may communicate directly with the NEF 218 with a request for access to UPF data. The NF 730 may send an event exposure request, which may conform to other event exposure requests disclosed herein. For example, the event exposure request may correspond to one or more requests for one or more UE private IP addresses, NAT mapping information, DPI information, and/or the like. Accordingly, in some embodiments, the NF 730 may invoke a service to retrieve one or more UE private IP addresses. The event exposure request may include the one or more UE public IP addresses. The event exposure request may further include one or more port numbers corresponding to the one or more UE public IP addresses. The event exposure request may further include one or more N4 session identities, one or more Domain Network Name (DNN) specifications, one or more Single Network Slice Selection Assistance Information (S-NSSAI) specifications, area of interest parameters, and/or the like specified for the event exposure to allow the NEF 218 or another component of the core to identify the domain to which the UPF service or SMF service belongs. The event exposure request may further include one or more of the optional requests disclosed herein, such as time period, additional filters, reporting filters and corresponding parameters, and/or the like.

The NF 730 may correspond to an AF in some embodiments. The NF 730 may not be a core NF but may be any NF residing outside core. The NF 730 may obtain one or more UE public IP addresses that it uses for the request(s) at least part in by detecting one or more UE public IP addresses in one or more packets outside of the core network, determining one or more source IP addresses (UE public IP addresses) of one or more devices of particular interest, receiving one or more UE public IP addresses from one or more systems that are remote from the core, and/or the like.

As indicated by 810, the NEF 218 may determine whether UPF service exposure or SMF service exposure is appropriate and approved for the request. As indicated by 815, the NEF 218 may communicate with the UDM 212 and/or SMF 214, the PDU session information may be queried, and the NEF 218 may receive information corresponding to the queried PDU session information. The event exposure request may include one or more N4 session identities, one or more Domain Network Name (DNN) specifications, one or more Single Network Slice Selection Assistance Information (S-NSSAI) specifications, area of interest parameters, and/or the like to allow the NEF 218 or another component of the core to identify the domain to which the UPF service or SMF service belongs. The DNN and S-NSSAI specifications can be used as additional identifiers. The DNN may indicate the domain to which the service belongs, whether there is an Internet data network, an IMS voice service, VPN, or another data network and domain to which the corresponding UE session belongs. The S-NSSAI may correspond to single network slice selection assistance information and may, for example, indicate a slice name (e.g., eMBB, URLLC, and/or V2X for a vertical slice or a public slice). For example, the external IP (public IP address) usually will be unique inside a Public Land Mobile Network (PLMN) but still can be reused in a different UPF.

Thus, for example, if the NF 730 provides the DNN and/or the S-NSSAI, such information may be used to select the right UPF 220 by providing it to the Network Repository Function (NRF) in order to identify the right UPF 220 if multiple UPFs can allocate the same external IP ranges. Accordingly, the NEF 218 may use the one or more N4 session identities, one or more DNN specifications, one or more S-NSSAI specifications, one or more area of interest parameters, and/or the like to search for and determine (e.g., via the NRF) the UPF 220 that can expose the requested data. Although only one UPF may be depicted in the figures for the sake of simplicity, there may be multiple and, indeed, many UPFs in the network, and, thus, the NEF 218 may identify the one UPF 220 that can expose the requested data.

As indicated by 820, the NEF 218 may communicate with the UPF 220, the communication corresponding to the event exposure request. In some embodiments, the NEF 218 may request from the UPF 220 IP mapping information, one or more UE private IP addresses with or without mapping information, and/or other UPF data corresponding to the one or more UE public IP addresses provided with the event disclosure request. Like the event disclosure request, the request from the NEF 218 may include the one or more UE public IP addresses and the one or more corresponding port numbers. The request from the NEF 218 may further include one or more N4 session identities, one or more IP domain specifications, one or more DNN specifications, one or more S-NSSAI specifications, area of interest parameters, and/or the like specified for the event exposure. In response, the UPF 220 may retrieve and provide IP mapping information, one or more UE private IP addresses with or without mapping information, and/or other UPF data corresponding to the one or more UE public IP addresses. In some embodiments, as indicated by 825 and 830, the UPF 220 may perform DPI for select IP addresses and may detect events satisfying the detection criteria according to the specified event detection requested, all as disclosed herein. As indicated by 835, the UPF 220 may communicate UPF data to the NEF 218, communicating one or more event exposure notifications, a list of IP addresses, IP mapping data, DPI results, and/or other UPF data.

In some embodiments, the UPF data may include the one or more UE private IP addresses retrieved by the UPF 220 that correspond to the one or more UE public IP addresses that were provided by the NF 730 at 805. The UPF data may further include the one or more IP domains of the one or more UE private IP addresses. A UE private IP address may include the corresponding IP domain identifier, or the corresponding IP domain identifier may be provided along with the UE private IP address. In some embodiments, the UPF data may additionally include IP mapping data corresponding to the mapping of the UE public IP address to the UE private IP address. As indicated by 840, the NEF 218 may then respond to the NF 730 with the UPF data. Having obtained the UPF data, the NF 730 may take various actions disclosed herein, such as determining policies to enforce with respect to the particular UEs and causing enforcement of those policies/service plans with respect to the UEs by communicating to the NEF 218 and/or the SMF 214.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known, processes, structures, and techniques have been shown without unnecessary detail in order to avoid obscuring the embodiments. This description provides example embodiments only and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed:

1. A method for obtaining data from a cellular network core, the method comprising:
   receiving, by the cellular network core, a request from a network function residing outside of the cellular network core, the request corresponding to a request for data from the cellular network core, wherein the request for data corresponds to a request for mapping information that maps an external IP address associated with user equipment residing outside of the cellular network core to an internal IP address maintained by the cellular network core;
   routing, by a network exposure function (NEF) of the cellular network core, the request to a user plane function (UPF) of the cellular network core;
   determining, by the UPF, UPF data responsive to the request for mapping information, wherein the UPF data comprises the mapping information; and
   transmitting the UPF data from the UPF to the network function residing outside of the cellular network core.

2. The method for obtaining data from a cellular network core as recited in claim 1, wherein the request for data further corresponds to a request for an internal Internet Protocol (IP) address associated with the user equipment residing outside of the cellular network core, and the UPF data further comprises the internal IP address.

3. The method for obtaining data from a cellular network core as recited in claim 2, wherein the request from the network function comprises an external IP address associated with the user equipment, and the internal IP address is mapped to the external IP address.

4. The method for obtaining data from a cellular network core as recited in claim 1, wherein the request from the network function is received by the NEF directly from the network function.

5. The method for obtaining data from a cellular network core as recited in claim 1, further comprising:
   routing, by the UPF, the UPF data to the NEF;

wherein the transmitting the UPF data from the UPF to the network function comprises transmitting the UPF data from the NEF directly to the network function residing outside the cellular network core.

6. The method for obtaining data from a cellular network core as recited in claim 1, wherein the request from the network function comprises one or both of an indication of a data network name (DNN) and an indication of single network slice selection assistance information (S-NSSAI).

7. The method for obtaining data from a cellular network core as recited in claim 6, further comprising using one or both of the DNN and the S-NSSAI to select the UPF from a plurality of UPFs of the cellular network core.

8. The method for obtaining data from a cellular network core as recited in claim 1, wherein the cellular network core is a 5G New Radio (NR) cellular network core.

9. A system comprising:
   a cellular network core that comprises a user plane function (UPF) and a network exposure function (NEF), wherein the cellular network core is configured to perform operations comprising:
   receiving, by the cellular network core, a request from a network function residing outside of the cellular network core, the request corresponding to a request for data from the cellular network core, wherein the request for data corresponds to a request for mapping information that maps an external IP address associated with user equipment residing outside of the cellular network core to an internal IP address maintained by the cellular network core;
   routing, by the NEF of the cellular network core, the request to the UPF of the cellular network core;
   determining, by the UPF, UPF data responsive to the request for mapping information, wherein the UPF data comprises the mapping information; and
   transmitting the UPF data from the UPF to the network function residing outside of the cellular network core.

10. The system as recited in claim 9, wherein the request for data further corresponds to a request for an internal Internet Protocol (IP) address associated with the user equipment residing outside of the cellular network core, and the UPF data further comprises the internal IP address.

11. The system as recited in claim 10, wherein the request from the network function comprises an external IP address associated with the user equipment, and the internal IP address is mapped to the external IP address.

12. The system as recited in claim 9, wherein the request from the network function is received by the NEF directly from the network function.

13. The system as recited in claim 9, the operations further comprising:
   routing, by the UPF, the UPF data to the NEF;
   wherein the transmitting the UPF data from the UPF to the network function comprises transmitting the UPF data from the NEF directly to the network function residing outside the cellular network core.

14. The system as recited in claim 9, wherein the request from the network function comprises one or both of an indication of a data network name (DNN) and an indication of single network slice selection assistance information (S-NSSAI).

15. The system as recited in claim 14, further comprising using one or both of the DNN and the S-NSSAI to select the UPF from a plurality of UPFs of the cellular network core.

16. The system as recited in claim 9, wherein the cellular network core is a 5G NR cellular network core.

17. One or more non-transitory, machine-readable media having machine-readable instructions thereon which, when executed by one or more processing devices, cause the one or more processing devices to perform operations comprising:

receiving a request from a network function residing outside of a cellular network core to the cellular network core, the request corresponding to a request for data from the cellular network core, wherein the request for data corresponds to a request for mapping information that maps an external IP address associated with user equipment residing outside of the cellular network core to an internal IP address maintained by the cellular network core;

routing the request from a network exposure function (NEF) of the cellular network core to a user plane function (UPF) of the cellular network core;

determining UPF data responsive to the request for mapping information, wherein the UPF data comprises the mapping information; and causing transmitting of the UPF data from the UPF to the network function residing outside of the cellular network core.

18. The one or more non-transitory, machine-readable media as recited in claim 17, wherein the request for data further corresponds to a request for an internal Internet Protocol (IP) address associated with the user equipment residing outside of the cellular network core, and the UPF data further comprises the internal IP address.

\*   \*   \*   \*   \*